United States Patent
Gao et al.

(10) Patent No.: US 12,212,764 B2
(45) Date of Patent: Jan. 28, 2025

(54) IMAGE COMPRESSION METHOD AND APPARATUS

(71) Applicant: SAMSUNG ELECTRONICS CO., LTD., Suwon-si (KR)

(72) Inventors: Ge Gao, Xi'an (CN); Pei You, Xi'an (CN); Rong Pan, Xi'an (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/682,581

(22) Filed: Feb. 28, 2022

(65) Prior Publication Data

US 2022/0286696 A1    Sep. 8, 2022

(30) Foreign Application Priority Data

Mar. 2, 2021    (CN) .......................... 202110231512.9
Jan. 24, 2022   (KR) ......................... 10-2022-0009943

(51) Int. Cl.
*H04N 19/42*     (2014.01)
*G06T 3/4046*    (2024.01)
(Continued)

(52) U.S. Cl.
CPC ........... *H04N 19/42* (2014.11); *G06T 3/4046* (2013.01); *H04N 19/136* (2014.11); *H04N 19/147* (2014.11); *H04N 19/91* (2014.11)

(58) Field of Classification Search
CPC .... H04N 19/42; H04N 19/136; H04N 19/147; H04N 19/91; H04N 19/59; G06T 3/4046
See application file for complete search history.

(56) References Cited

U.S. PATENT DOCUMENTS

| | | |
|---|---|---|
| 9,613,439 B1 | 4/2017 | Raj |
| 2017/0109901 A1 | 4/2017 | Raj |

(Continued)

FOREIGN PATENT DOCUMENTS

| | | |
|---|---|---|
| CN | 107181949 A | 9/2017 |
| CN | 109544451 A | 3/2019 |

(Continued)

OTHER PUBLICATIONS

Haris, Muhammad, et al. "Deep Back-Projection Networks for Super-Resolution." Proceedings of the IEEE conference on computer vision and pattern recognition. 2018., (10 pages).

(Continued)

*Primary Examiner* — Tracy Y. Li
(74) *Attorney, Agent, or Firm* — NSIP Law

(57) ABSTRACT

An image compression method includes obtaining a hidden variable of an input image using a coding network of a deep learning neural network comprising at least one downsampling back projection module including performing downsampling transformation on a first feature map of the input image input to the downsampling back projection module to obtain a second feature map, obtaining a third feature map having a same resolution as a resolution of the first feature map by reconstructing the second feature map, and obtaining a fourth feature map as an optimization result of the second feature map, based on a difference value between the first feature map and the third feature map; and obtaining a bitstream file of a compressed image by performing entropy coding based on the hidden variable obtained based on the fourth feature map of a last downsampling back projection module.

20 Claims, 21 Drawing Sheets

(51) Int. Cl.
*H04N 19/136* (2014.01)
*H04N 19/147* (2014.01)
*H04N 19/91* (2014.01)

(56) References Cited

U.S. PATENT DOCUMENTS

| | | | |
|---|---|---|---|
| 2019/0303715 A1* | 10/2019 | Jiang | G06F 18/24137 |
| 2019/0373293 A1* | 12/2019 | Bortman | H04N 19/59 |
| 2020/0402205 A1* | 12/2020 | Su | G06T 3/4046 |
| 2021/0150678 A1* | 5/2021 | Yi | G06N 3/084 |
| 2022/0004870 A1* | 1/2022 | Wang | G10L 25/51 |
| 2022/0084166 A1* | 3/2022 | Navarrete Michelini | G06N 3/08 |
| 2022/0086463 A1* | 3/2022 | Coban | H04N 19/90 |
| 2022/0103839 A1* | 3/2022 | Van Rozendaal | H04N 19/184 |

FOREIGN PATENT DOCUMENTS

| | | |
|---|---|---|
| CN | 110148087 A | 8/2019 |
| CN | 110956671 A | 4/2020 |
| CN | 111681166 A | 9/2020 |
| CN | 112330542 A | 2/2021 |
| JP | 2013-254268 A | 12/2013 |
| KR | 10-2127151 B | 6/2020 |

OTHER PUBLICATIONS

Chinese Office Action issued on May 31, 2023, in counterpart Chinese Patent Application No. 202110231512.9 (8 pages in English, 7 pages in Chinese).

\* cited by examiner

IMAGE COMPRESSION METHOD AND APPARATUS

CROSS-REFERENCE TO RELATED APPLICATIONS

This application claims the benefit under 35 USC § 119(a) of Chinese Patent Application No. 202110231512.9 filed on Mar. 2, 2021, in the China National Intellectual Property Administration, and Korean Patent Application No. 10-2022-0009943 filed on Jan. 24, 2022, in the Korean Intellectual Property Office, the entire disclosures of which are incorporated herein by reference for all purposes.

BACKGROUND

1. Field

The following disclosure relates to an image compression method and apparatus.

2. Description of Related Art

High-quality compressed images are important in network transmission and storage on mobile platforms. However, as the resolution of an image sensor increases, the size of the original image gradually increases, which may result in bandwidth issues during network transmission and storage in a mobile terminal. In such existing issues, the current image compression algorithm is broadly classified into two types: one type is an existing method based on filtering or block prediction, and the other type is a deep learning-based method of constructing a neural network to perform feature extraction and compression. In the existing method, a large number of prediction modes need to be manually designed, which results in a large amount of time and effort. In the case of a high compression rate, a very obvious blocking effect tends to appear, which influences the quality of a compressed image. Although the deep learning-based method has been developed to some extent, image blurring, noise, and compression artifacts still occur.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an image compression method, includes: obtaining a hidden variable of an input image using a coding network of a deep learning neural network comprising at least one downsampling back projection module, wherein each of the at least one downsampling back projection module includes performing downsampling transformation on a first feature map of the input image input to the least one downsampling back projection module to obtain a second feature map, obtaining a third feature map having a same resolution as a resolution of the first feature map by reconstructing the second feature map, and obtaining a fourth feature map as an optimization result of the second feature map, based on a difference value between the first feature map and the third feature map; and obtaining a bitstream file of a compressed image by performing entropy coding based on the hidden variable obtained based on the fourth feature map of a last downsampling back projection module among the at least one downsampling back projection module.

The obtaining of the fourth feature map may further include obtaining an optimized third feature map by optimizing the difference value between the first feature map and the third feature map, and optimizing the third feature map based on the optimized difference value, and obtaining the fourth feature map by performing downsampling and optimization on the optimized third feature map.

The obtaining of the fourth feature map may further include obtaining a final fourth feature map by optimizing a difference value between the obtained fourth feature map and the second feature map, and optimizing the obtained fourth feature map based on the optimized difference value.

The obtaining of the third feature map may include performing feature processing on the second feature map through a convolution operation, performing upsampling transformation on the second feature map on which the feature processing is performed, and obtaining the third feature map by performing feature processing on the second feature map, on which the upsampling transformation is performed, through another convolution operation.

The obtaining of the optimized third feature map may include obtaining a first difference value feature map by subtracting the first feature map and the third feature map, performing feature learning on the first difference value feature map through a convolution operation, obtaining an added feature map by adding the feature-learned first difference value feature map and a subtracted feature map, and obtaining the optimized third feature map by performing feature learning on the added feature map through another convolution operation.

The obtaining of the fourth feature map by performing the downsampling and the optimization on the optimized third feature map may include downsampling the optimized third feature map through a convolution operation and extracting a feature of the downsampled third feature map, and obtaining the fourth feature map by performing feature learning on a feature map obtained by extracting the feature through another convolution operation.

The obtaining of the final fourth feature map may include obtaining a second difference value feature map by subtracting the obtained fourth feature map and the second feature map, performing feature learning on the second difference value feature map through a convolution operation, obtaining an added feature map by adding the feature-learned second difference value feature map and a subtracted feature map, and obtaining the optimized third feature map by performing feature learning on the added feature map through another convolution operation.

The obtaining of the final fourth feature map may include obtaining a second difference value feature map by subtracting the obtained fourth feature map and the second feature map, performing feature learning on the second difference value feature map through a convolution operation, obtaining an attention score by extracting a feature of the feature-learned second difference value feature map through an attention mechanism, obtaining a first weighted feature map by multiplying the obtained fourth feature map and the attention score, obtaining a second weighted feature map by multiplying the second feature map and a value obtained by subtracting the attention score from "1", obtaining a weighted feature map by adding the first weighted feature map and the second weighted feature map, and obtaining the final fourth feature map by performing feature learning on the weighted feature map through another convolution operation.

The image compression method may further include extracting a high-frequency component and a low-frequency component from the input image. The coding network may include a high-frequency coding subnetwork and a low-frequency coding subnetwork. The high-frequency coding subnetwork and the low-frequency coding subnetwork each may each at least one downsampling back projection module. The obtaining of the hidden variable of the input image based on the input image, using the coding network may include obtaining a high-frequency hidden variable of the high-frequency component using the high-frequency coding subnetwork, the high-frequency hidden variable being obtained based on a high-frequency fourth feature map of a high-frequency last downsampling back projection module among at least one high-frequency downsampling back projection module included in the high-frequency coding subnetwork; obtaining a low-frequency hidden variable of the low-frequency component using the low-frequency coding subnetwork, the low-frequency hidden variable being obtained based on a low-frequency fourth feature map a low-frequency last downsampling back projection module among at least one low-frequency downsampling back projection module included in the low-frequency coding subnetwork; and obtaining the hidden variable of the input image by fusing the high-frequency hidden variable and the low-frequency hidden variable.

The obtaining of the hidden variable of the input image by fusing the high-frequency hidden variable and the low-frequency hidden variable may include obtaining a first splicing hidden variable by splicing the high-frequency hidden variable and the low-frequency hidden variable; using a spatial attention mechanism, independently performing average pulling and maximum pulling on the first splicing hidden variable in a channel direction, obtaining a second splicing hidden variable by splicing the first splicing hidden variable, on which the average pulling is performed, and the first splicing hidden variable, on which the maximum pulling is performed, and calculating a spatial attention score of the second splicing hidden variable through a convolution operation; using a channel attention mechanism, performing a pooling operation on the first splicing hidden variable in a spatial dimension and calculating a channel attention score of the first splicing hidden variable, on which the pooling operation is performed, through another convolution operation; obtaining a weighted low-frequency hidden variable of the low-frequency component by weighting the low-frequency hidden variable using the channel attention score and the spatial attention score; obtaining a weighted high-frequency hidden variable of the high-frequency component by weighting the high-frequency hidden variable using a value obtained by subtracting the channel attention score from "1" and a value obtained by subtracting the spatial attention score from "1"; and obtaining a sum of the weighted low-frequency hidden variable and the weighted high-frequency hidden variable as the hidden variable of the input image.

In another general aspect, an image decompression method includes obtaining a hidden variable by performing entropy decoding on a bitstream file of a compressed image, and obtaining a reconstructed image of the compressed image based on the hidden variable using a reconstruction network of a deep learning neural network comprising at least one upsampling back projection module. Each of the at least one upsampling back projection module includes performing upsampling transformation on a fifth feature map of the compressed image input to the upsampling back projection module to obtain a sixth feature map, obtaining a seventh feature map having a same resolution as a resolution of the fifth feature map by reconstructing the sixth feature map, and obtaining an eighth feature map as an optimization result of the sixth feature map based on a difference value between the fifth feature map and the seventh feature map, and using the eighth feature map obtained by a last upsampling back projection module among the at least one upsampling back projection module in the reconstruction network as the reconstructed image.

The obtaining of the eighth feature map may include obtaining an optimized seventh feature map by optimizing the difference value between the fifth feature map and the seventh feature map and by optimizing the seventh feature map based on the optimized difference value, and obtaining the eighth feature map by performing upsampling and optimization on the optimized seventh feature map.

The obtaining of the eighth feature map may further include obtaining a final eighth feature map by optimizing a difference value between the obtained eighth feature map and the sixth feature map and by optimizing the sixth feature map based on the optimized difference value.

The obtaining of the seventh feature map may include performing feature processing on the sixth feature map through a convolution operation, performing downsampling transformation on the sixth feature map on which the feature processing is performed, and obtaining the seventh feature map by performing feature processing on the sixth feature map, on which the downsampling transformation is performed, through another convolution operation.

The obtaining of the optimized seventh feature map may include obtaining a third difference value feature map by subtracting the fifth feature map and the seventh feature map, performing feature learning on the third difference value feature map through a convolution operation, obtaining an added feature map by adding the feature-learned third difference value feature map and a subtracted feature map, and obtaining the optimized seventh feature map by performing feature learning on the added feature map through another convolution operation.

The obtaining of the eighth feature map by performing the upsampling and optimization on the optimized seventh feature map may include upsampling the optimized seventh feature map through a convolution operation, and extracting a feature of the upsampled seventh feature map; and obtaining the eighth feature map by performing feature learning on a feature map obtained by extracting the feature through another convolution operation.

The obtaining of the final eighth feature map may include obtaining a fourth difference value feature map by subtracting the obtained eighth feature map and the sixth feature map, performing feature learning on the fourth difference value feature map through a convolution operation, obtaining an added feature map by adding the feature-learned fourth difference value feature map and a subtracted feature map, and obtaining the optimized seventh feature map by performing feature learning on the added feature map through another convolution operation.

The obtaining of the final eighth feature map may include obtaining a fourth difference value feature map by subtracting the obtained eighth feature map and the sixth feature map, performing feature learning on the fourth difference value feature map through a convolution operation, obtaining an attention score by extracting a feature of the feature-learned fourth difference value feature map through an attention mechanism, obtaining a third weighted feature map by multiplying the obtained eighth feature map and the attention score, obtaining a fourth weighted feature map by multiplying the sixth feature map and a value obtained by subtracting the attention score from "1", obtaining a weighted feature map by adding the third weighted feature map and the fourth weighted feature map, and obtaining the final eighth feature map by performing feature learning on the weighted feature map through another convolution operation.

In another general aspect, an image compression apparatus includes a coding network configured to obtain a hidden variable of an input image, the coding network being a deep learning neural network and comprising at least one downsampling back projection module, and an entropy coding network configured to obtain a bitstream file of a compressed image by performing entropy coding based on the hidden variable. The at least one downsampling back projection module may include a downsampling module, a reconstruction module, and an optimization module, the downsampling module is configured to perform downsampling transformation on a first feature map of the input image input to the downsampling module to obtain a second feature map, the reconstruction module is configured to obtain a third feature map having a same resolution as a resolution of the first feature map by reconstructing the second feature map, the optimization module is configured to obtain a fourth feature map as an optimization result of the second feature map, based on a difference value between the first feature map and the third feature map, and the hidden variable is obtained based on the fourth feature map obtained by a last downsampling back projection module among the at least one downsampling back projection module in the coding network.

The optimization module may include a first difference value feedback submodule and a downsampling optimization submodule, the first difference value feedback submodule is configured to obtain an optimized third feature map by optimizing the difference value between the first feature map and the third feature map and by optimizing the third feature map based on the optimized difference value, and the downsampling optimization submodule is configured to obtain the fourth feature map by performing downsampling and optimization on the optimized third feature map.00

Other features and aspects will be apparent from the following detailed description, the drawings, and the claims.

Figure 1:
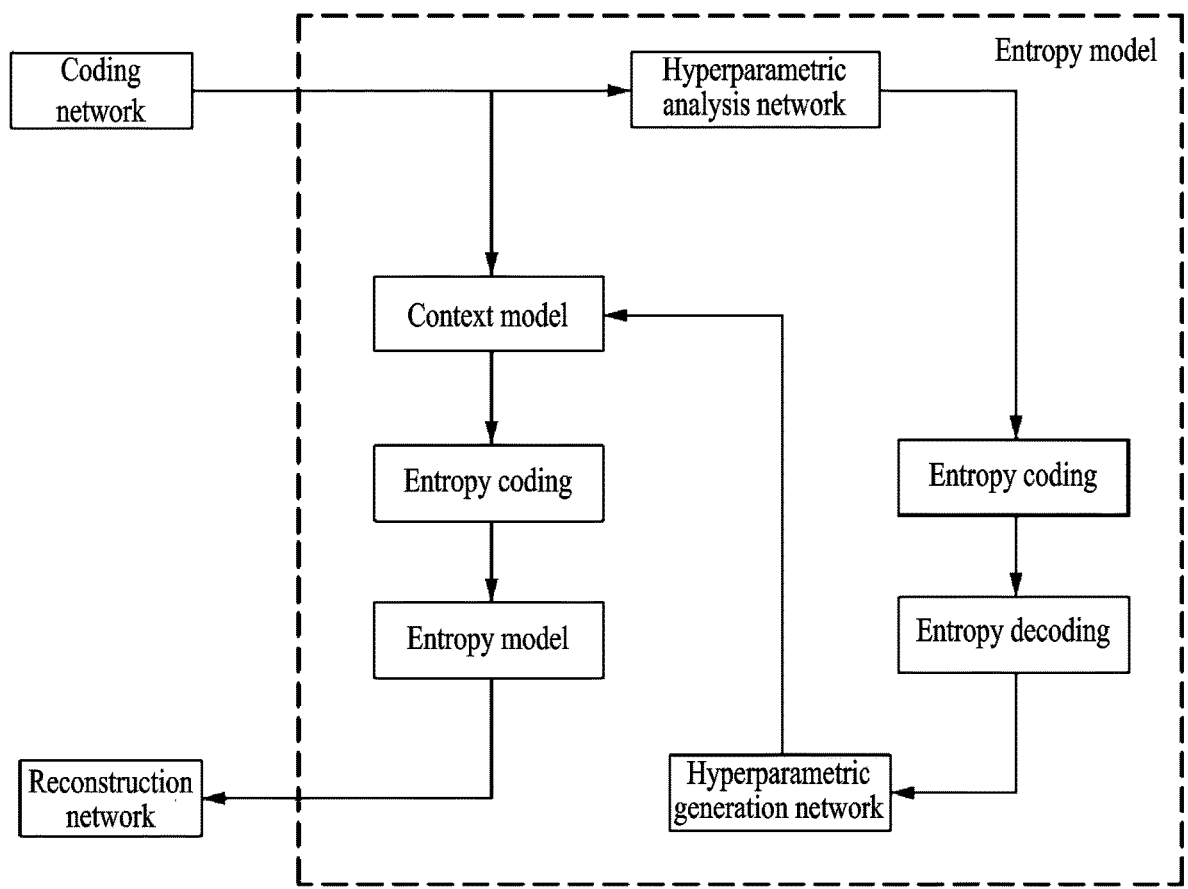
FIG. 1 illustrates an example of an end-to-end image compression model structure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Here, it should be noted that "at least one of several items" appearing in the present disclosure means "any one of several items", "any combination of several items", and "all of several items" in juxtaposition. For example, "including at least one of A and B" may include the following three parallel situations: (1) including A; (2) including B; and (3) including A and B. As another example, "executing at least one of operations 1 and 2" may indicate three parallel situations: (1) executing operation 1; (2) executing operation 2; (3) executing operations 1 and 2.

A deep learning-based image compression method may construct and implement mapping from the original image to a reconstruction image using a deep neural network. Local contextual information of each pixel in a high-resolution feature map may be learned using a convolution kernel, and accordingly, a network may estimate a corresponding pixel value before quantization according to a value of a neighboring pixel, which may lead to a decrease in a quantization error and an increase in a quality of a reconstruction image. Deep learning-based methods may be broadly divided into two methods. One method may be used to obtain a post-processed reconstruction image by inputting a reconstruction image of an existing scheme to a post-processing network by adding a post-processing neural network based on the existing scheme. Such a post-processing neural network has had some success in terms of an image super-resolution and image noise removal, and the like. However, since the reconstruction image of the existing scheme has noticeable compression artifacts, a post-processing network may fail to effectively remove compression artifacts. That is, compression artifacts may be still present in the reconstruction image. The other method based on deep learning may be end-to-end image compression, and an end-to-end method may typically employ variational autoencoders or generative adversarial networks (GANs). All of the variational autoencoders or GANs may process an input image using a hidden variable representing the input image through a coding neural network, quantize the hidden variable through a context model and extract distribution parameters, to generate a bitstream file, that is, a compressed image using entropy coding. The bitstream may be entropy-decoded to obtain a hidden variable, and the hidden variable may obtain a reconstruction image through a generation neural network of a variational autoencoder or a generator of a GAN. A method of a GAN may give more attention to a recognition effect, and a problem of a structural similarity index Measure (SSIM) difference between a generated image and the original image may occur. Due to a lack of suitability, a variational autoencoder method may cause a blurred image generation and occurrences of noise and compression artifacts at a high compression rate.

In the existing scheme, an information loss in a compression process fails to be effectively processed. Examples of information losses in end-to-end image compression will be described below. In an example, information may be lost due to the quantization of a hidden variable. For example, an existing end-to-end depth compression model may need to quantize a hidden variable before compression, such that an entropy coding scheme may compress the original data without distortion. Such an information loss due to quantization may negatively influence image restoration. Specifically, a numerical difference due to quantization may be amplified for each layer in a multi-upsampling process of a reconstruction image, and finally, a difference between the reconstruction image and the original image may increase, and a problem such as compression artifacts may occur. In another example, information may be lost in upsampling/downsampling transformation processes. A convolution-based downsampling task may cause an irreversible information loss, and accordingly, an image may not be properly reconstructed from low-dimensional incomplete information, which may cause an ill-posed problem in an upsampling process. Here, a loss of information may primarily reflect a lack of high-frequency details. For example, an existing end-to-end image compression network may mainly construct a deep neural network, learn and capture a mapping relationship between a high resolution and a low resolution from a large quantity of image data, and improve the suitability of a model using a mechanism such as a skip connection, an attention, and the like. However, the above scheme may fail to essentially prevent an information loss caused by upsampling/downsampling transformation, and may cause a problem such as a relatively low quality of a reconstruction image and an incomplete structure. In addition, the existing end-to-end image compression network may ensure reversibility between upsampling and downsampling using invertible neural networks. However, due to the relatively poor suitability of a reversible neural network, a reconstruction image may have a problem such as edge-blurring, low texture restoration, and the like. That is, an information loss may be a major cause to reduce an image compression quality. A lack of an effective method to mitigate an information loss may greatly limit the distribution suitability of end-to-end neural networks and may interfere with the learning of a mapping relationship between feature maps with different resolutions during a compression and reconstruction process.

To more effectively mitigate a decrease in a quality of a reconstruction image due to an information loss in an end-to-end image compression process, the present disclosure may innovatively propose a back projection-based image compression method that may perform modeling of an information loss in an upsampling/downsampling process, form a mapping error between feature maps with different resolutions, and reduce an error by optimizing network parameters, to greatly enhance a restoration quality of an image at the same code rate. In addition, it may be easy to extend a highly modularized design according to the examples, and a corresponding method may be easily modified or extended as necessary in practical applications. In addition, the image compression method of the present disclosure may propose processing an image by decomposing the image into a high-frequency component and a low-frequency component, respectively, so that an image compression model may more effectively process high-frequency information that is easily lost in a compression process, reduce an information loss, and optimize rate-distortion performance of the image compression model. In addition, parameters and/or structures of two networks for processing a high-frequency component and a low-frequency component may be the same or different. For example, by setting parameters of the two networks differently, processed low-frequency and high-frequency information may be flexibly and adaptively processed and fused as necessary, and thus rate-distortion performance of the image compression method may be effectively optimized.

Hereinafter, an image compression method and an image compression apparatus, an image decompression method and an image decompression apparatus, an end-to-end image compression method, and an end-to-end image compression apparatus according to examples will be described in detail with reference to FIGS. 1 through 21.

Figure 2:
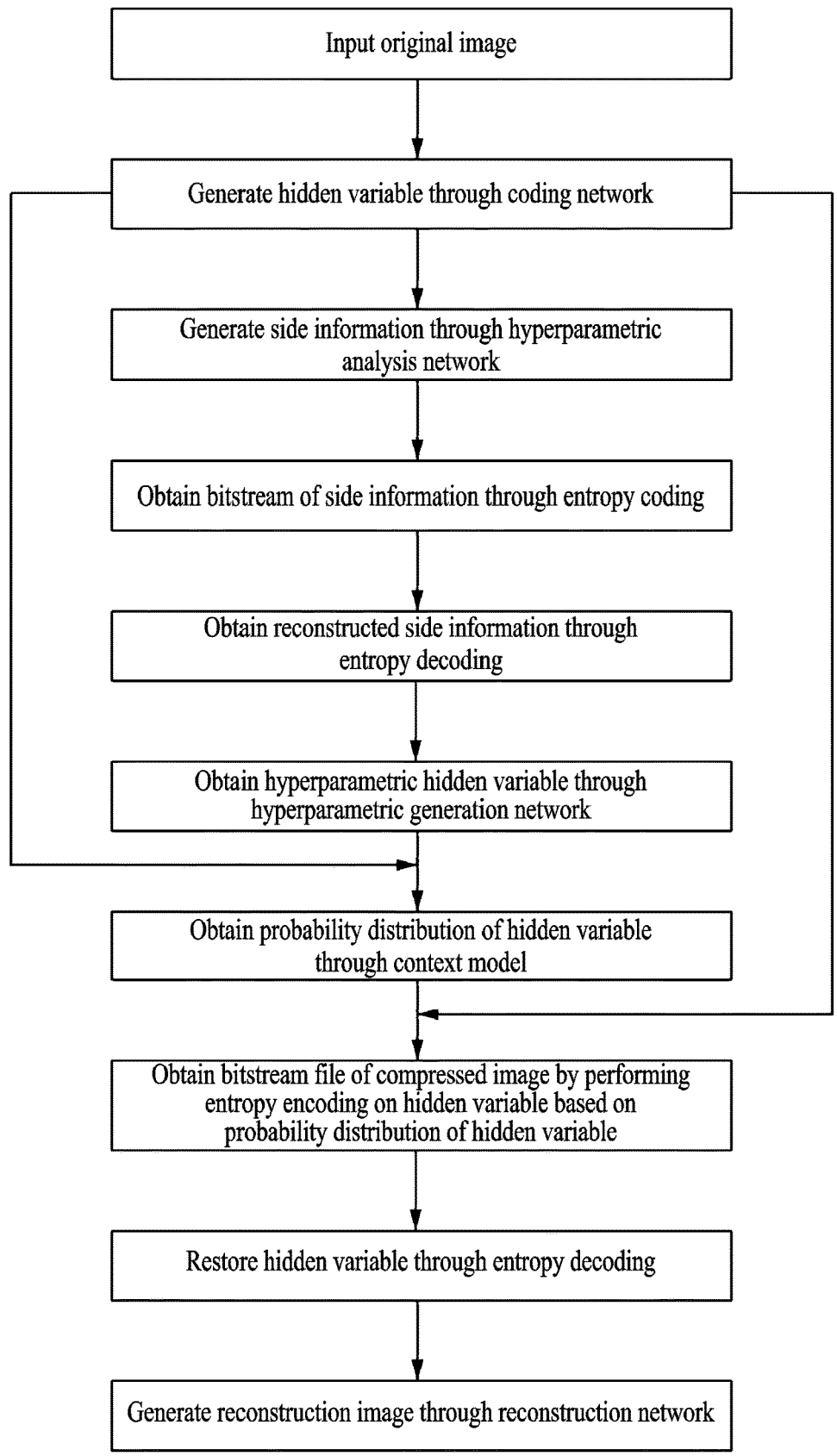
FIG. 2 illustrates an example of an end-to-end image compression flow.

FIG. 1 illustrates an example of an end-to-end image compression model structure. FIG. 2 illustrates an example of an end-to-end image compression flow. According to the examples, an image compression method may be applied to a variational autoencoder; however, there is no limitation thereto. Thus, for example, FIGS. 1 and 2 illustrate an end-to-end image compression model and flow of the present disclosure based on a structure of a variational autoencoder. However, according to the examples, a back projection-based image compression method may be applied to all possible image compression models.

Referring to FIGS. 1 and 2, an end-to-end image compression model may largely include a coding network, an entropy model, and a reconstruction network. The entropy model may largely include a hyperparametric analysis network, a hyperparametric generation network, and a context model. First, the original image may be input. Subsequently, the original image may be mapped to a low-dimensional hidden variable representation via the coding network. Subsequently, side information may be generated by performing downsampling transformation on an obtained hidden variable, through the hyperparametric analysis network for each step. Subsequently, a bitstream file may be obtained by arithmetically encoding the side information through entropy coding. Subsequently, reconstructed side information may be obtained by decoding the bitstream file through entropy decoding. Subsequently, a hyperparametric hidden variable may be generated by processing the reconstructed side information through the hyperparametric generation network. Subsequently, by transmitting the hidden variable and the hyperparameter hidden variable together to the context model, a probability distribution parameter of the hidden variable may be obtained by estimating a probability distribution of the hidden variable. Subsequently, a bitstream file of a compressed image may be obtained by performing entropy encoding on the hidden variable using the probability distribution parameter of the hidden variable. All image compression processes may be completed. For decompression, first, the hidden variable may be restored by decoding the bitstream file of the compressed image through entropy decoding. Subsequently, an upsampling transformation may be performed on the hidden variable through the reconstruction network for each step, to finally generate a reconstruction image. Hereinafter, an example of the end-to-end image compression model will be described, however, there is no limitation thereto.

An input of an encoding network may be a three-channel RGB image. The coding network may be formed by alternately stacking eight downsampling residual blocks of two different types, and may include two spatial attention modules to enhance an expression capability of a model. The first type of residual blocks (referred to as "short-circuit residual blocks") may include two convolution layers with a convolution kernel size of 3×3 and "128" channels, and a short-circuit connection. A first convolution layer may use LeakyReLU as an activation function and may downsample a resolution of an input feature map by a factor of 2. A second convolution layer may extract a feature of a sampled feature map, maintain a size of an output feature map using zero padding, and use a generalized divisive normalization (GDN) as a normalization function to enhance a feature learning capability of a convolution layer. The second type of residual blocks (referred to as "skip residual blocks") may include two convolution layers with a convolution kernel size of 3×3 which use LeakyReLU as an activation function and which maintain a size of a feature map using zero padding, and a skip connection, and may be used to further learn effective features. By alternately stacking the two types of residual blocks and performing repetition four times, the original image may be downsampled to a hidden variable with a size 1/16 and "128" channels. After second and fourth skip residual blocks, an attention module may be connected to adaptively weight a feature map.

The hyperparametric analysis network may include five stacked convolution layers with a kernel size of 3×3, which use LeakyReLU as an activation function. A third convolution layer and a fifth convolution layer may obtain side information with "128" channels and a ¼ resolution of the hidden variable by downsampling a feature map twice. The hyperparametric generation network may also include five stacked convolution layers with a kernel size of 3×3, which use LeakyReLU as an activation function. A second convolution layer and a fourth convolution layer may upsample a feature map twice using deconvolution, and accordingly, the third and fourth convolution layers may have "192" channels, and the fifth convolution layer may have "256" channels. A size of a spatial correlation feature map generated by the hyperparametric generation network may be the same as the size of the hidden variable, and a number of channels may be doubled.

The context model may include a mask convolution layer with a convolution core size of 5×5, and three convolution layers with a convolution core size of 1×1. The mask convolution kernel may mask a pixel below a central point and a pixel on a right side of the central point with zeros, to simulate a situation in which a current position value is unknown during actual decoding. The spatial correlation feature map and hidden variable may be spliced to a channel and input to the context model, and finally, a feature map with the same size as that of the hidden variable and with "3NK" channels may be generated. Here, N may be a number (i.e., "128") of channels of the hidden variable, and K may be a number of Gaussian mixture model distributions (k=3 in the experiment). The obtained feature map may be divided into nine equal parts along a channel, to obtain a weight, an average value, and a variance corresponding to three Gaussian distributions. The Gaussian mixture model may generate a probability estimate for the distribution of hidden variables, and implement lossless arithmetic encoding and decoding of hidden variables.

The reconstruction network and the coding network may have a mirror structure, and may upsample the hidden variable by a factor of 2 four times, by alternately using skip residual blocks and short-circuit residual blocks. A first convolution layer of a short-circuit residual block may upsample a feature map by a factor of 2 using a channel-to-space method, and follow an inverse generalized divisive normalization (IGDN) layer. A last upsampling convolution layer of the reconstruction network may have three channels and may respectively correspond to three RGB channels of a reconstruction image.

According to the examples, a back projection method may be applied to an operation of upsampling/downsampling transformation of the coding network and the reconstruction network to hierarchically enhance the quality of an intermediate feature. Similarly, the back projection method may mitigate a reconstruction error caused by quantizing a hidden variable. Specifically, in a downsampling process of the coding network, a high-resolution feature map may be reconstructed through an upsampling operation (e.g., deconvolution, subpixel convolution, etc.), a difference value between the original feature map and a reconstructed high-resolution feature map may be extracted as an information loss, and features may be additionally extracted from the difference value through a trainable network structure (e.g., a convolution layer, an attention mechanism, etc.). Subsequently, a low-resolution feature map capable of more accurately reconstructing the original feature map may be adaptively generated. In an upsampling process of the reconstruction network, information may be extracted from a high-resolution feature map that includes richer features through a downsampling task (e.g., convolution, interpolation, etc.), and a difference value between the information and the original low-resolution feature map may be explicitly processed as new distinctive information. To further learn distinctive information, a trainable network structure may be used. The distinctive information may be fused with a current low-resolution feature map, thereby increasing an amount of distinctive information in a low-resolution feature map and performing upsampling again to a more accurate high-resolution feature map.

The back projection method may be an operation of reconstructing the above-described feature map, feeding back a reconstruction error, and optimizing the reconstruction error. Using the back projection method in an image compression task, bidirectional information exchange may be realized by feeding back a reconstruction result to a current task, an amount of information in a current feature map may be increased, and a quality of a feature map after resampling may be enhanced, to effectively mitigate a decrease in a quality of an intermediate feature map obtained by upsampling/downsampling transformation due to a small number of convolution layers and inaccurate low-resolution information.

Figure 3:
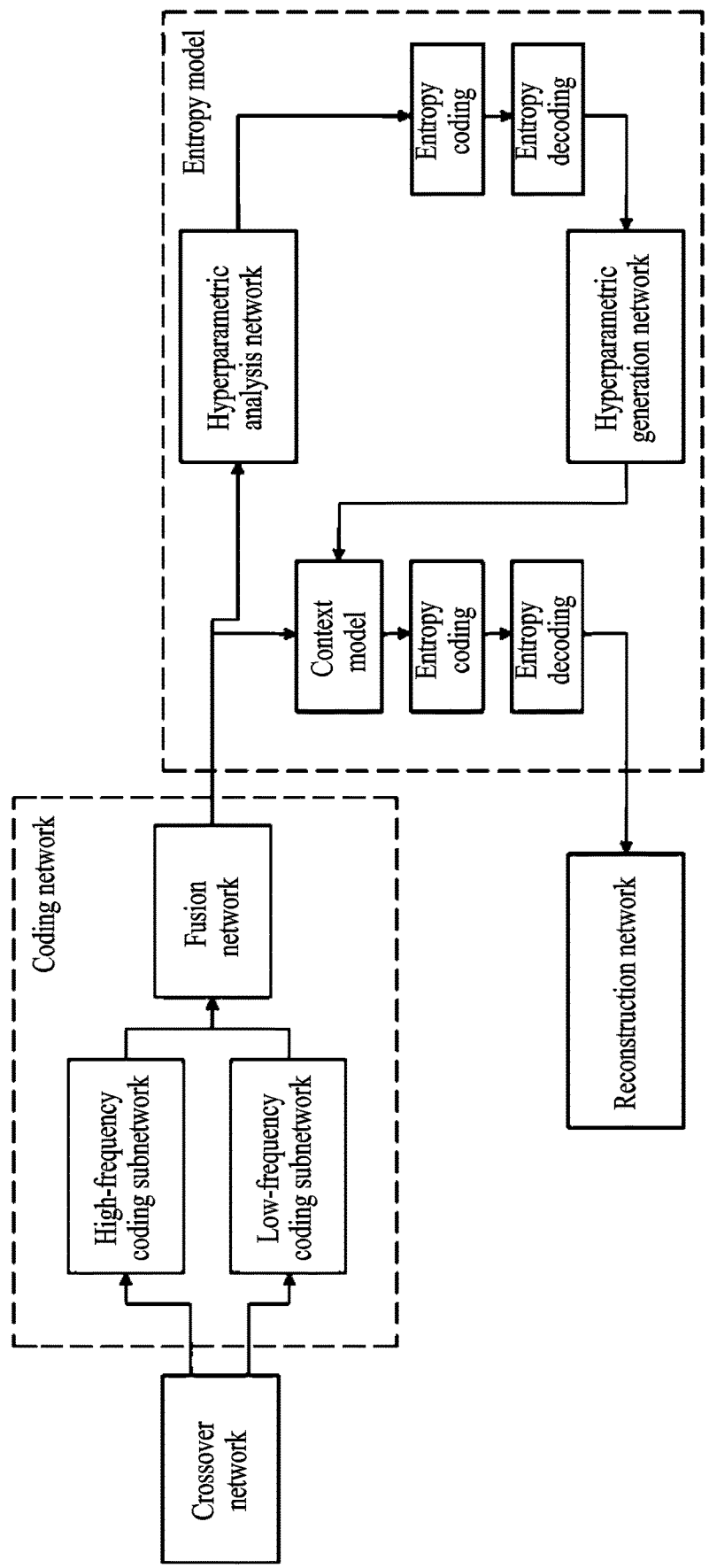
FIG. 3 illustrates another example of an end-to-end image compression model.
Figure 4:
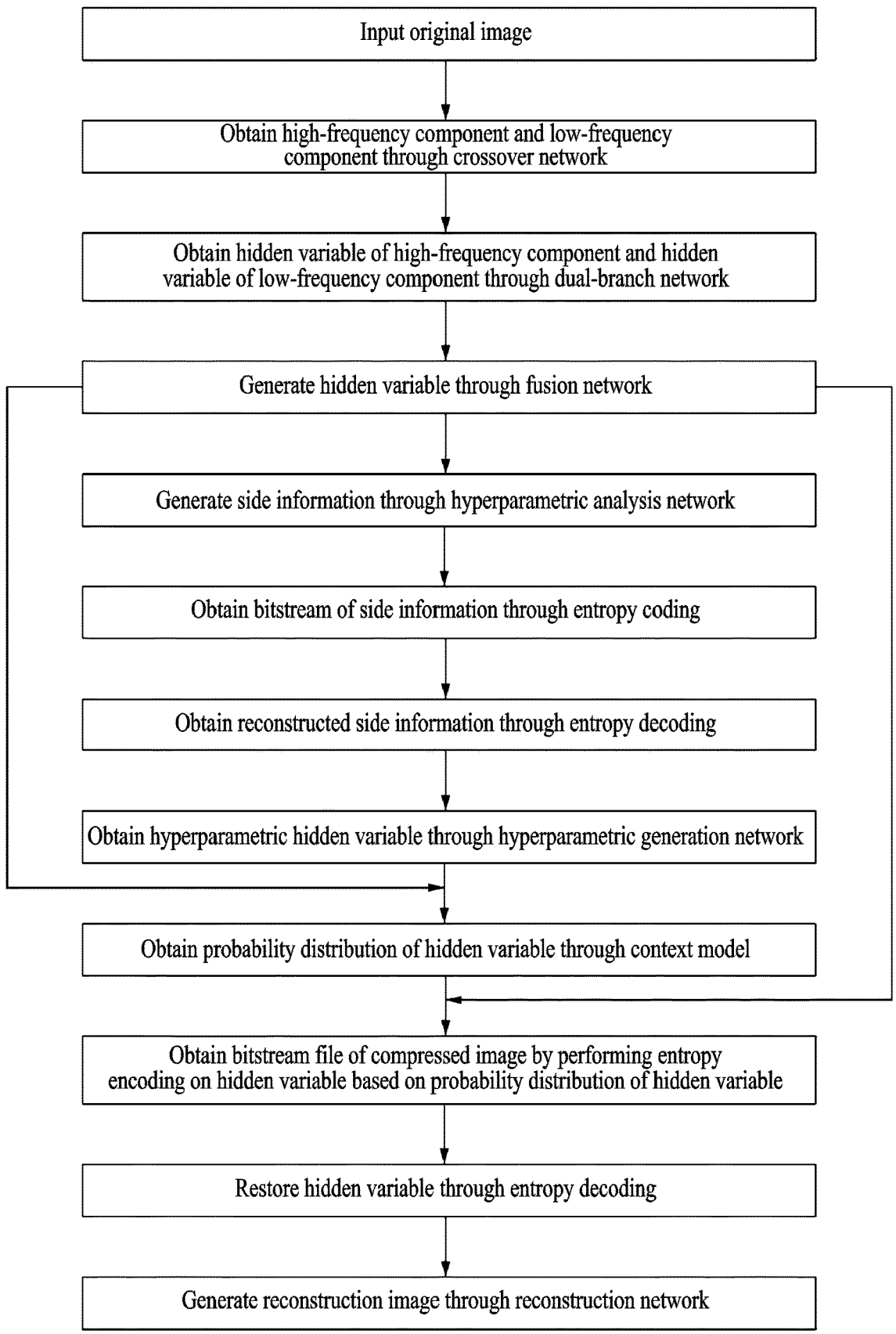
FIG. 4 illustrates another example of an end-to-end image compression flow.

FIG. 3 illustrates another example of an end-to-end image compression model. FIG. 4 illustrates another example of an end-to-end image compression flow.

Referring to FIGS. 3 and 4, an end-to-end image compression model of FIG. 3 may further include a crossover network and a coding network of FIG. 3 may include a high-frequency coding subnetwork, a low-frequency coding subnetwork, and a fusion network. Accordingly, the end-to-end image compression model of FIG. 3 may differ from the end-to-end image compression model of FIG. 1. Structures and/or parameters of the high-frequency coding subnetwork and the low-frequency coding subnetwork may be the same (e.g., the same as the coding network shown in FIG. 1). Of course, the structures and/or parameters of the high-frequency coding subnetwork and the low-frequency coding subnetwork may be different. For example, by setting parameters of the high-frequency coding subnetwork and parameters of the low-frequency coding subnetwork to be different, low-frequency and high-frequency information after processing may be flexibly and adaptively processed and fused as necessary, to optimize the rate-distortion performance of the image compression method.

Specifically, first, a high-frequency component and a low-frequency component may be extracted from an original image using a crossover network. Subsequently, a high-frequency component and a low-frequency component may be mapped to low-dimensional hidden variables through the high-frequency coding subnetwork and the low-frequency coding subnetwork, respectively, to obtain a hidden variable of the high-frequency component and a hidden variable of the low-frequency component. Subsequently, the hidden variable of the high-frequency component and the hidden variable of the low-frequency component may be fused again through a fusion network to generate a fused hidden variable. In addition, an entropy model and a reconstruction network of the end-to-end image compression model of FIG. 3 may have the same functions as those of the entropy model and the reconstruction network of the end-to-end image compression model of FIG. 1, and accordingly, further description is not repeated herein.

In the present disclosure, high-frequency components and low-frequency components of the original image may be extracted using a frequency domain decomposition method (e.g., wavelet transform, smoothing filtering, etc.), and may be individually processed and fused. Thus, a network may focus more on high-frequency details that are easily lost in a downsampling process, and may explicitly and effectively process a loss of high-frequency information in a compression process. In addition, since parameters of two networks that process high-frequency components and low-frequency components may be differently set, a low-frequency hidden variable and a high-frequency hidden variable after downsampling may be flexibly and adaptively processed and fused as necessary. Thus, it may be possible to further increase the quality of a reconstruction image of a model at the same code rate and possible to effectively optimize the rate-distortion performance of the image compression method.

Figure 5:
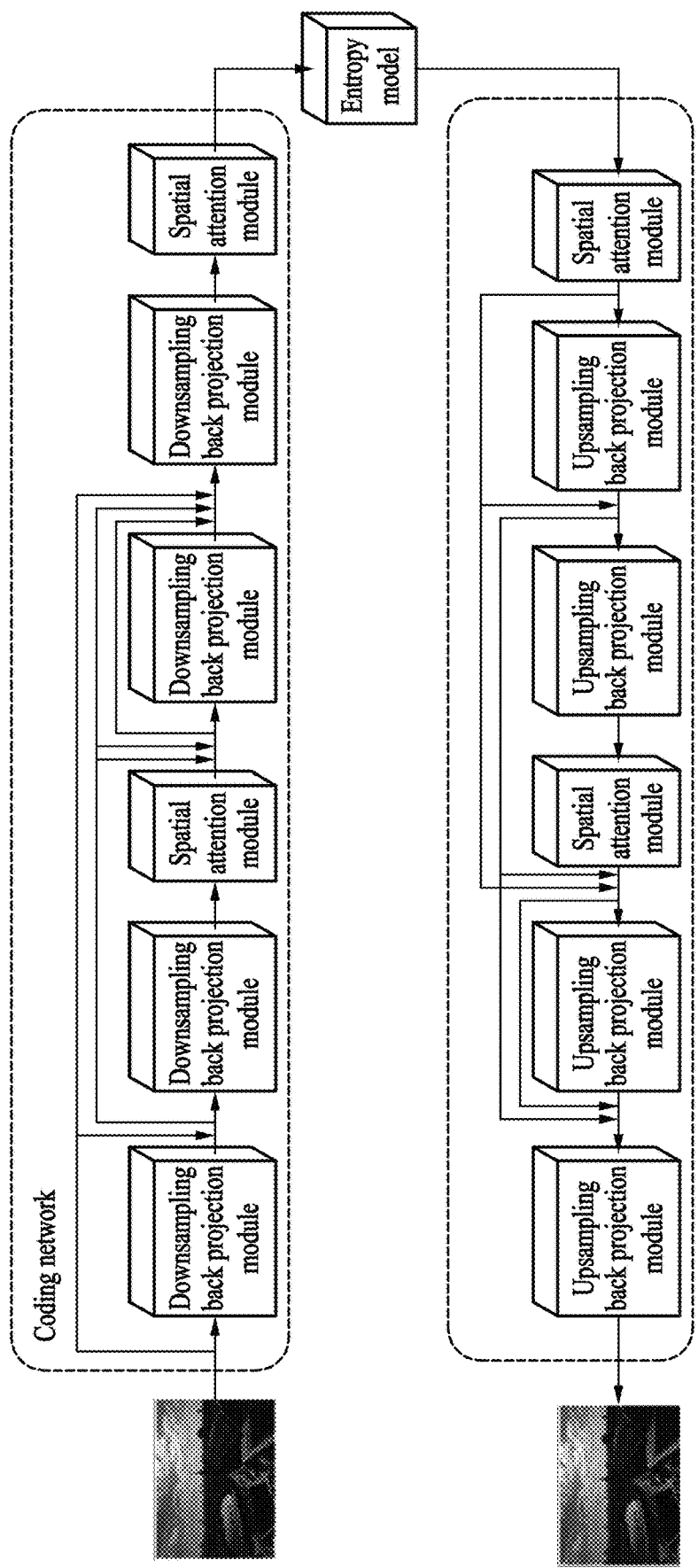
FIG. 5 illustrates an example of an end-to-end image compression model network.

FIG. 5 illustrates an example of an end-to-end image compression model network.

Referring to FIG. 5, first, an input image may pass through a coding network of the end-to-end image compression model, so that a hidden variable may be obtained. Subsequently, a bitstream file of a compressed image may be obtained by performing entropy coding based on the hidden variable, and a decoded hidden variable may be obtained by performing entropy decoding on the bitstream file of the compressed image. This process may be realized by an entropy model. For example, the entropy model may include functions of side information entropy coding, side information entropy decoding, hidden variable entropy coding and hidden variable entropy decoding, a hyperparametric analysis network, a hyperparametric generation network, and a context model. The above functions have been described above, and accordingly, further description thereof is not repeated herein. Subsequently, based on the decoded hidden variable, a reconstruction image may be obtained through a reconstruction network of the end-to-end image compression model. Hereinafter, a coding network according to an example will be described in detail.

The coding network may include at least one downsampling back projection module configured to perform downsampling transformation on the input image at least one time, to obtain a hidden variable. Here, the coding network may include a number of downsampling back projection modules corresponding to a number of times downsampling transformation is performed. In the present disclosure, the number of times downsampling transformation is performed and the number of downsampling back projection modules are not limited. According to an example, the coding network may be formed by stacking four downsampling back projection modules, and a spatial attention module may be connected behind each of a second downsampling back projection module and a fourth downsampling back projection module to enhance an expression capability thereof. However, the number of downsampling back projection modules, a number of spatial attention modules and positions of the spatial attention modules are not limited thereto. For example, a plurality of downsampling back projection modules may be directly stacked.

Each downsampling back projection module may include a downsampling module, a reconstruction module, and an optimization module. The downsampling module may be used to downsample and transform an input first feature map to obtain a second feature map. The reconstruction module may be used to reconstruct the second feature map to obtain a third feature map with the same resolution as the first feature map. The optimization module may be used to optimize the second feature map based on a difference value between the first feature map and the third feature map, and to obtain a fourth feature map as an output of the downsampling back projection module. Hereinafter, a structure of a downsampling back projection module will be described in detail.

Figure 6:
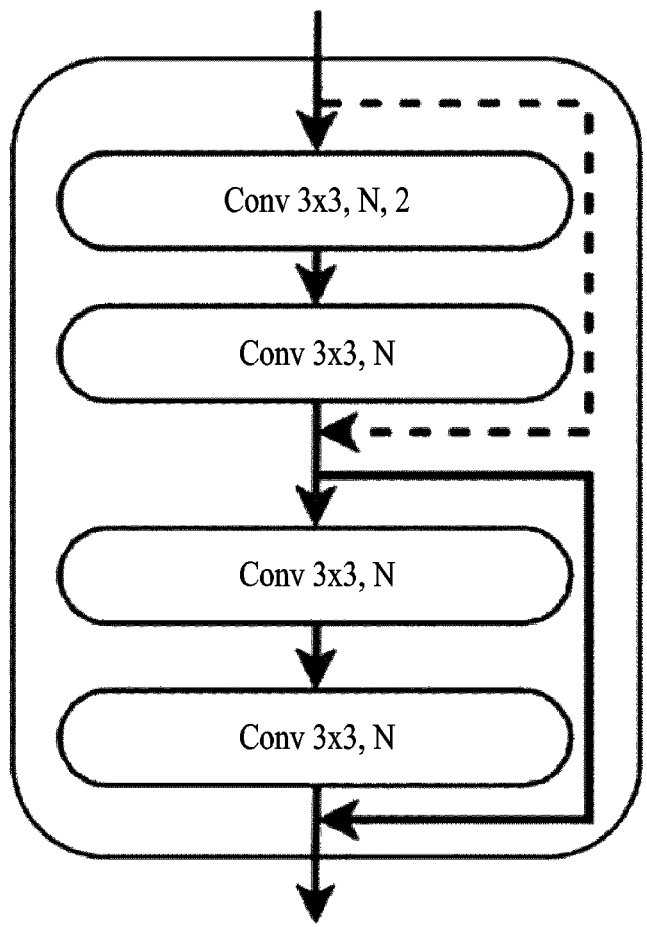
FIG. 6 illustrates an example of a structure of a downsampling module in a coding network.

According to an example, the downsampling module may have a structure of a downsampling residual block in the coding network described above with reference to FIG. 1. The downsampling module may be formed by alternately stacking two different types of residual blocks to implement a function of downsampling a feature map by a factor of 2 at once. FIG. 6 illustrates an example of a structure of a downsampling module in a coding network. Referring to FIG. 6, the downsampling module may be formed by stacking a short-circuit residual block and a skip residual block. The short-circuit residual block may include two convolution layers (e.g., two convolution layers having a convolution kernel size of 3×3 and "N" channels) and a short-circuit connection indicated by a dashed line. A first convolution layer may be used to downsample a resolution of a feature map twice, and a second convolution layer may be used to provide a feature learning function of a convolution layer. The skip residual block may include two convolution layers (e.g., two convolution layers that have a convolution kernel size of 3×3 and "N" channels, that use LeakyReLU as an activation function and that maintain a size of a feature map using zero padding), and a skip connection indicated by a solid line, and may obtain the second feature map by additionally learning effective features. The present disclosure is not limited to the above-described structure of the downsampling module.

Figure 7:
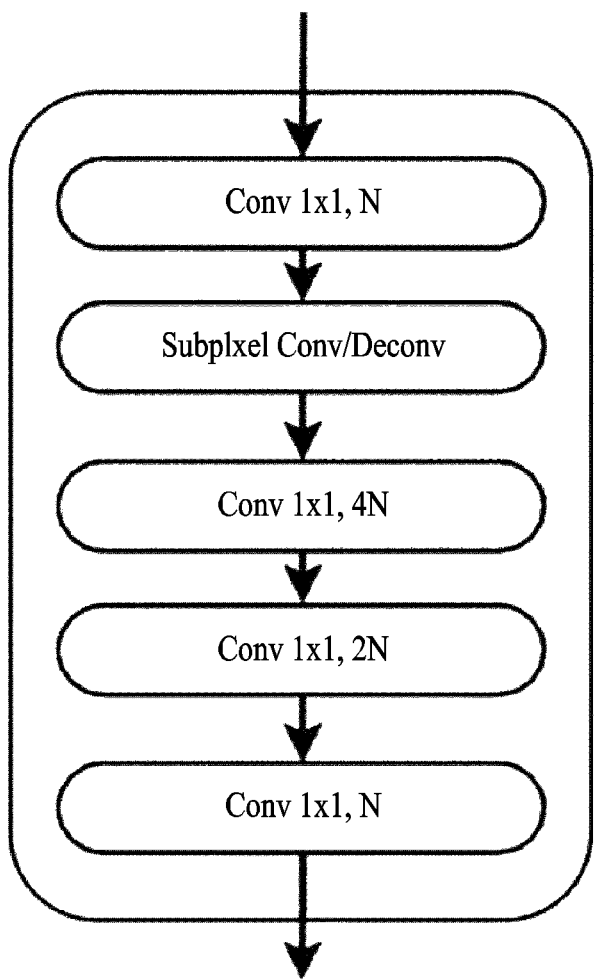
FIG. 7 illustrates an example of a structure of a reconstruction module in a coding network.

According to an example, the reconstruction module may be configured with a plurality of convolution layers that are sequentially connected, and may also include an operation of an attention module and a skip connection for enhancing a feature learning capability. FIG. 7 illustrates an example of a structure of a reconstruction module in a coding network. Referring to FIG. 7, the reconstruction module may be configured by sequentially connecting a convolution layer (e.g., a first convolution layer, Cony 1×1) having a convolution kernel of 1×1, an upsampling layer, and three convolution layers (e.g., second through fourth convolution layers) having a convolution kernel of 1×1. The first convolution layer may be used to perform feature processing on the second feature map, and may use LeakyReLU as an activation function and maintain a size of a feature map after convolution, using zero padding without a change. The upsampling layer may be used to perform upsampling transformation (e.g., deconvolution, subpixel convolution, subpixel Conv/Deconv, etc.) on the second feature map on which the feature processing is performed. The second through fourth convolution layers may be used to obtain a third feature map by performing feature processing on the second feature map on which the upsampling transformation is performed. These three convolution layers may use LeakyReLU as an activation function and allow a number of output feature map channels to remain unchanged. The present disclosure is not limited to the structure of the reconstruction module.

According to an example, the optimization module may include a first difference value feedback submodule and a downsampling optimization submodule. The first difference value feedback submodule may be used to fuse and process information between the first feature map and the third feature map. Specifically, the first difference value feedback submodule may be used to obtain an optimized third feature map by optimizing a difference value between the first feature map and the third feature map and optimizing the third feature map based on the optimized difference value. The downsampling optimization submodule may obtain the fourth feature map by performing downsampling and optimization on the optimized third feature map.

Figure 8:
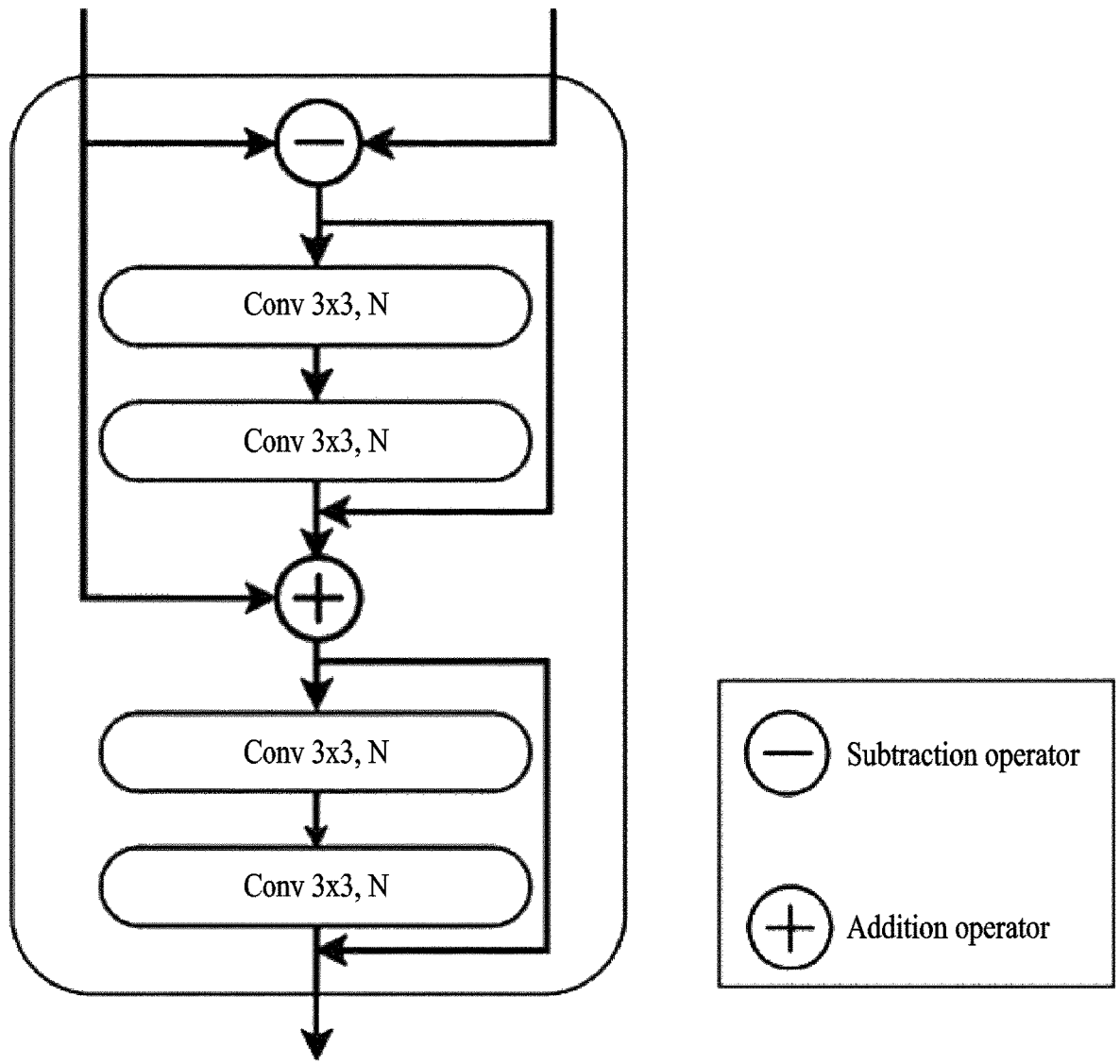
FIG. 8 illustrates an example of a structure of a first difference value feedback submodule in a coding network.

FIG. 8 illustrates an example of a structure of a first difference value feedback submodule in a coding network. Referring to FIG. 8, the first difference value feedback submodule may include a subtraction operator, a first skip residual block, an addition operator, and a second skip residual block. The subtraction operator may be used to obtain a first difference value feature map (also referred to as a "distinctive information feature map") by subtracting the first feature map and the third feature map. The first skip residual block may include two convolution layers (e.g., two convolution layers with a convolution kernel size of 3×3 which use LeakyReLU as an activation function and maintain an output size using zero padding), and a skip connection, and may be used to learn the first difference value feature map. The addition operator may be used to obtain an added feature map by adding the first difference value feature map, on which feature learning is performed, and a subtracted feature map. In the present specification, a feature map, on which feature learning is performed, may be referred to as a "feature-learned feature map." The second skip residual block may include two convolution layers (e.g., two convolution layers with a convolution kernel of 3×3 which use LeakyReLU and sigmoid as an activation function and maintain an output size using zero padding), and a skip connection, and may be used to obtain the optimized third feature map by performing feature learning on the added feature map.

Figure 9:
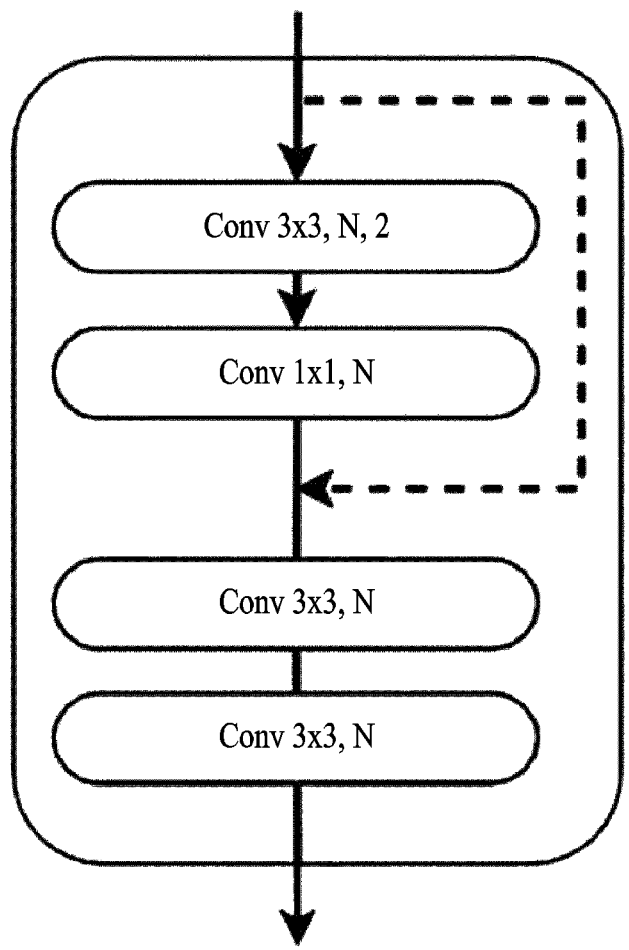
FIG. 9 illustrates an example of a structure of a downsampling optimization submodule in a coding network.

FIG. 9 illustrates an example of a structure of a downsampling optimization submodule in a coding network. Referring to FIG. 9, the downsampling optimization submodule may include a short-circuit residual block, and two connected convolution layers. The short-circuit residual block may include two convolution layers used to downsample the optimized third feature map and extract a feature of the downsampled third feature map, and a short-circuit connection. For example, a first convolution layer may be used to downsample a resolution of a feature map using convolution, and a second convolution layer (e.g., a convolution layer with a convolution kernel size of 1×1) may be used to extract a feature of the downsampled feature map. The first and second convolution layers may maintain a size of an output feature map using zero padding and use a GDN as a normalization function, to enhance a feature learning capability thereof. In addition, a fourth feature map may be obtained through feature learning of an output of the short-circuit residual block using two connected convolution layers (e.g., two convolution layers with a convolution kernel size of 3×3 which are sequentially connected).

According to an example, since in the coding network, the first difference value feedback submodule performs a difference value feedback optimization based on a high-resolution intermediate image (e.g., a reconstruction image obtained by upsampling), instead of performing a difference value feedback optimization based on a low-resolution intermediate image (e.g., a second feature map obtained by downsampling), the optimization module may further include a second difference value feedback submodule to perform a difference value feedback optimization based on the low-resolution intermediate image, to enhance an optimization effect. Specifically, the second difference value feedback submodule may be used to obtain a final fourth feature map by optimizing a difference value between a second feature map and a fourth feature map output by the downsampling optimization module and optimizing the fourth feature map based on the optimized difference value. Therefore, according to the examples, in each back projection module, a current feature map may be divided twice and optimized. Feature fusion and difference value feedback of multiple scales (e.g., a high resolution and a low resolution) may be realized. Accordingly, a model may more effectively extract and process new information by guaranteeing the overall numerical stability of a feature map. Thus, it may be possible to continue increasing the quality of a reconstruction image while maintaining the stability of training. In addition, through a highly modularized design, the back projection method may be easily distributed and extended. In practical applications, depending on a factor such as a model speed, a memory space, and a compression quality, whether to use a multi-stage reconstruction and parameter sharing mechanism may be selected.

Figure 10:
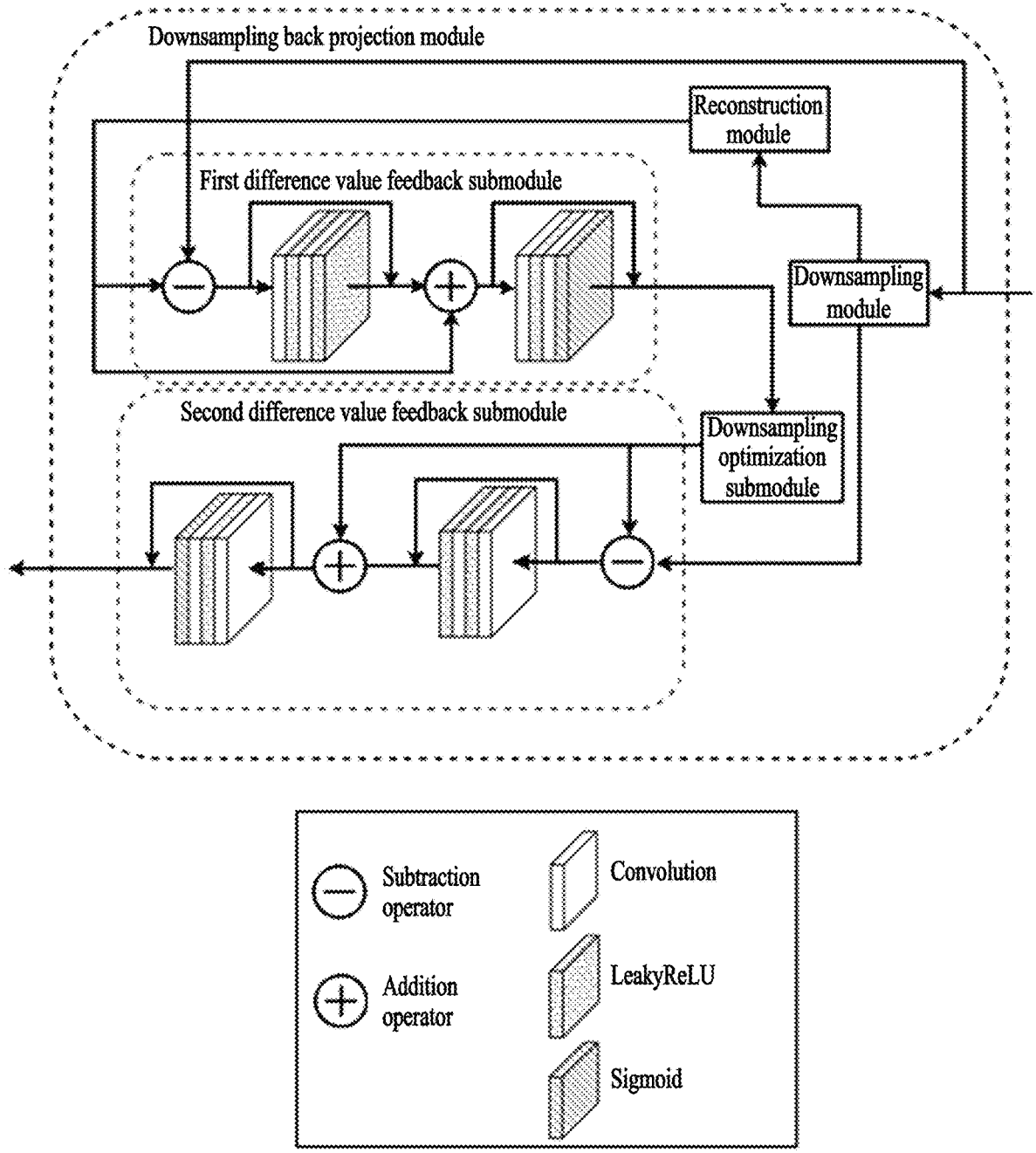
FIG. 10 illustrates an example of a structure of a downsampling back-projection module.

FIG. 10 illustrates an example of a structure of a downsampling back projection module.

Referring to FIG. 10, a first feature map may be input to a downsampling module to obtain a second feature map.

A reconstruction module $F_e$ may extract a feature of a current feature map $i_t$ (i.e., the second feature map) and perform reconstruction to generate a reconstruction feature map $e_t\downarrow$ (i.e., the third feature map) having the same dimension as that of a feature map $i_{t-1}\downarrow$ on which downsampling transformation is not performed. Here, $\downarrow$ denotes a result obtained before reconstruction by downsampling transformation is performed, and t corresponds to an order of a sampling transformation task. The above reconstruction operation may be expressed as shown below.

$$e_t\downarrow = F_e(i_t) \qquad (1)$$

A first difference value feedback submodule $F_r$ may transmit the generated reconstructed feature map $e_t\downarrow$ and an optimized feature map $y_{t-1}\downarrow$ (i.e., the first feature map) generated in a previous operation together to a difference value feedback module $F_r$, to obtain a difference value feature map $c_t\downarrow$. If t=1, the reconstruction feature map $e_t\downarrow$ and the original feature map $i_{t-1}\downarrow$ (i.e., the first feature map) may be transmitted together to the first difference value feedback submodule to obtain the difference value feature map $c_t\downarrow$ (i.e., an optimized third feature map). The first difference value feedback submodule $F_r$ may obtain distinctive information by calculating a difference value between two input feature maps, and the obtained distinctive information may be further learned through an operation such as convolution layer stacking, a skip connection, and the like. Subsequently, the first difference value feedback submodule $F_r$ may add the distinctive information and a subtracted feature map, and implement information fusion through an operation such as convolution layer stacking, a skip connection, and the like, to obtain an optimized feature map. The above difference value feedback optimization operation may be expressed as shown below.

$$c_t\downarrow = F_r(e_t\downarrow, y_{t-1}\downarrow) \qquad (2)$$

A downsampling optimization submodule $F_u$ may perform downsampling transformation and optimization operations on the reconstruction feature map $c_t\downarrow$ to obtain an optimized feature map $y_t$ (i.e., a fourth feature map). The above downsampling optimization operation may be expressed as shown below.

$$y_t = F_u(c_t\downarrow) \qquad (3)$$

A structure of a second difference value feedback submodule $F_{r'}$ may be the same as that of the first difference value feedback submodule. Accordingly, the optimized feature map $y_t$ and the current original feature map $i_t$ may be transmitted together to the second difference value feedback module $F_{r'}$, and an optimized feature map $y_t'$ having the same size and number of channels as those of the current feature map $i_t$ may be obtained. The above difference value feedback optimization operation may be expressed as shown below.

$$y_t' = F_{r'}(i_t, y_t) \qquad (4)$$

Figure 11:
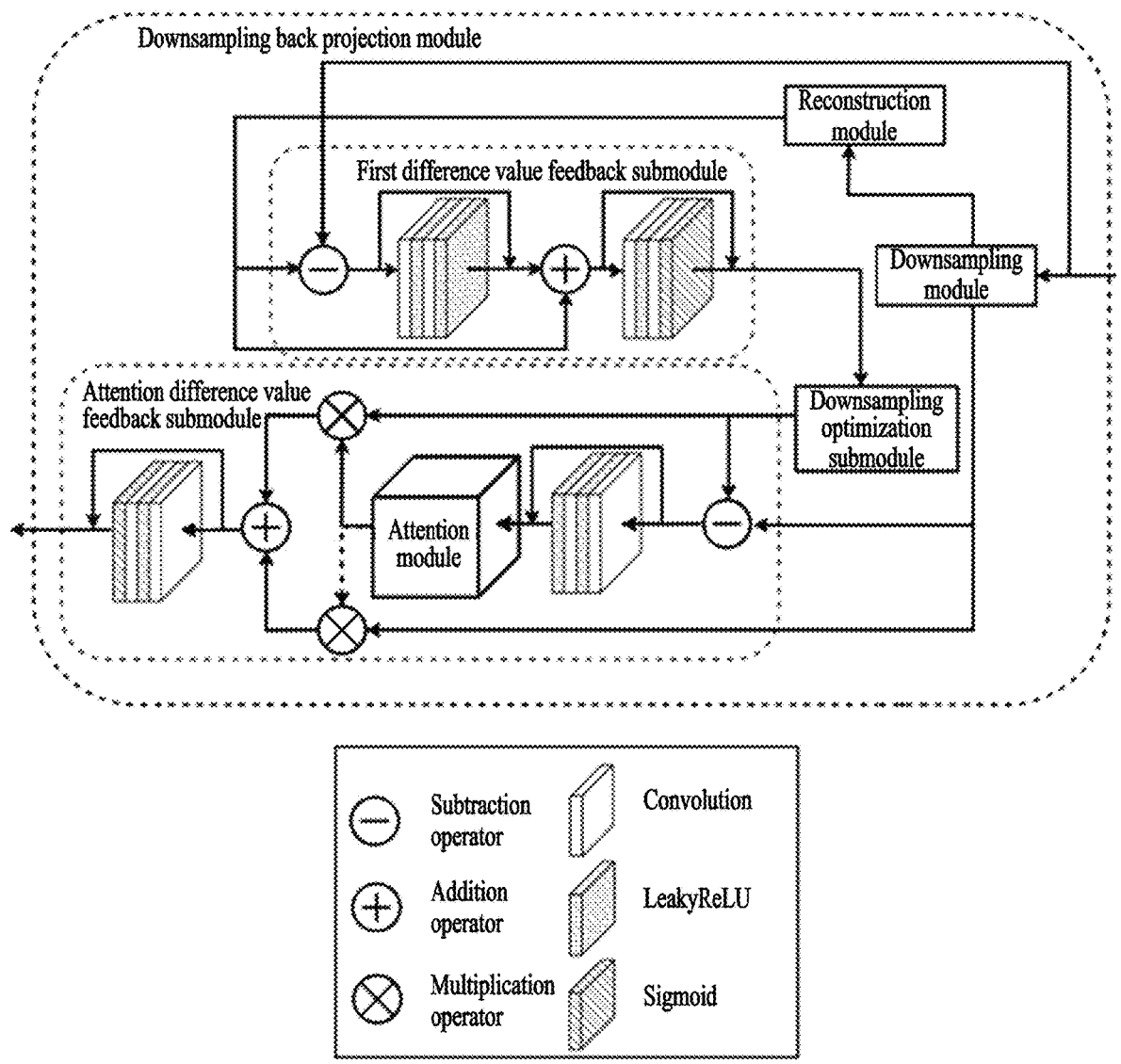
FIG. 11 illustrates another example of a structure of a downsampling back-projection module.

FIG. 11 illustrates another example of a downsampling back projection module structure.

Referring to FIG. 11, a structure of a second difference value feedback submodule may be different from that of a first difference value feedback submodule. For example, the second difference value feedback submodule may be a difference value feedback submodule based on an attention mechanism, and may include a subtraction operator, a first skip residual block, an attention module, a first multiplication operator, a second multiplication operator, an addition operator, and a second skip residual blocks. The subtraction operator may be used to obtain a second difference value feature map (also referred to as a "distinctive information feature map") by subtracting a fourth feature map output by a downsampling optimization submodule and a second feature map output by a downsampling module. The first skip residual block may include two convolution layers (e.g., two convolution layers with a convolution kernel of 3×3 which use LeakyReLU as an activation function and maintain an output size using zero padding), and a skip connection, and may be used to perform feature learning on the second difference value feature map. The attention module may be used to obtain an attention score W by extracting a feature of the feature-learned second difference value feature map. Here, the attention module may be a spatial attention module or a channel attention module. For example, a Squeeze-Excitation network may be used as a channel attention module. The first multiplication operator may be used to multiply W (indicated by a solid line) and the fourth feature map output by the downsampling optimization module to obtain a first weighted feature map. The second multiplication operator may be used to multiply the second feature map by (1-W) (indicated by a dotted line) to obtain a second weighted feature map. The addition operator may be used to obtain a weighted feature map by adding the first weighted feature map and the second weighted feature map. The second skip residual block may include two convolution layers (e.g., two convolution layers with a convolution kernel of 3×3 which use LeakyReLU and sigmoid as activation functions, respectively, and maintain an output size using zero padding), and a skip connection, and may be used to obtain the final fourth feature map through feature learning of the weighted feature map. The second difference value feedback submodule based on the attention mechanism is not limited to a structure based on the attention mechanism, and may have all possible structures based on the attention mechanism.

Based on the attention mechanism, the first difference value feedback submodule may also be implemented as a difference value feedback module. For example, an optimized third feature map may be generated by weighting the first feature map and the third feature map using the attention mechanism.

In the present disclosure, a difference value feedback submodule of the coding network may be implemented as a difference value feedback submodule based on the attention mechanism. A module may give more attention to a predetermined portion using a soft attention mechanism and selectively weight a feature map. Thus it may be possible to increase the effect and efficiency of image compression by further increasing an information processing and fusion capability of a difference value feedback module.

Figure 12:
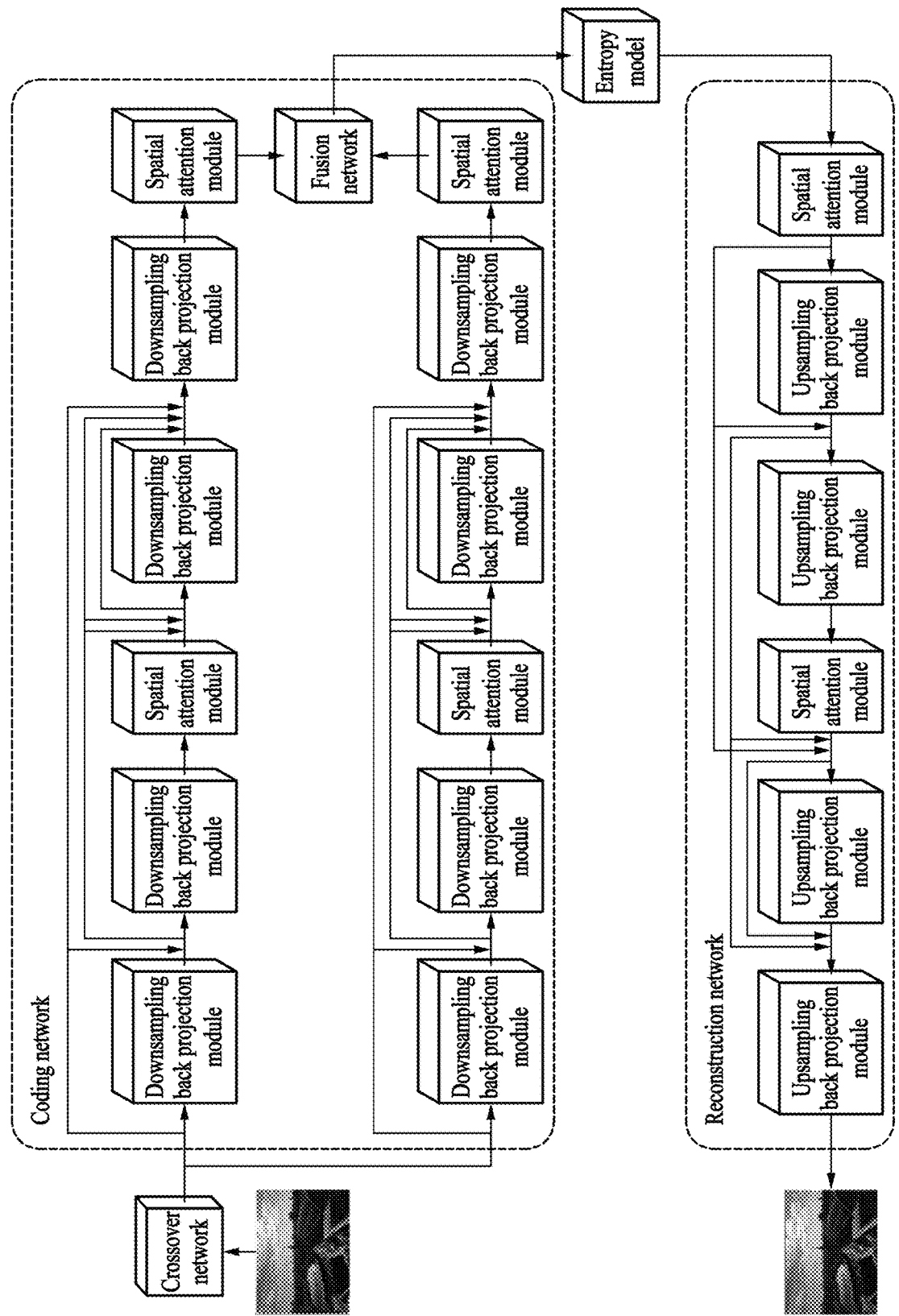
FIG. 12 illustrates another example of an end-to-end image compression model network.

FIG. 12 illustrates another example of an end-to-end image compression model network.

Referring to FIG. 12, a structure of a coding network of the end-to-end image compression model of FIG. 12 may differ from that of the end-to-end image compression model of FIG. 5. The end-to-end image compression model of FIG. 12 may further include a crossover network, and the coding network illustrated in FIG. 12 may include a high-frequency coding subnetwork, a low-frequency coding subnetwork, and a fusion network. The crossover network may be used to extract a high-frequency component and a low-frequency component from an input image. The high-frequency coding subnetwork and the low-frequency coding subnetwork may each include at least one downsampling back projection module. A structure and/or parameters of the high-frequency coding subnetwork and a structure and/or parameters of the low-frequency coding subnetwork may be the same, and may be the same as those of the coding network of FIG. 5, for example. The structure and/or parameters of the high-frequency coding subnetwork and the structure and/or parameters of the low-frequency coding subnetwork may be different from each other. The high-frequency coding subnetwork may be used to perform downsampling transformation on the high-frequency component to obtain a hidden variable of the high-frequency component, and the low-frequency coding subnetwork may be used to perform downsampling transformation on the low-frequency component to obtain a hidden variable of the low-frequency component. The fusion network may be used to obtain a fused hidden variable as a final hidden variable by fusing the hidden variable of the high-frequency component and the hidden variable of the low-frequency component. The structures of the high-frequency coding subnetwork and the low-frequency coding subnetwork may be the same as that of the coding network of FIG. 5, and accordingly, further description thereof is not repeated herein. Hereinafter, an example of a crossover network and a fusion network according to the examples will be described.

Figure 13:
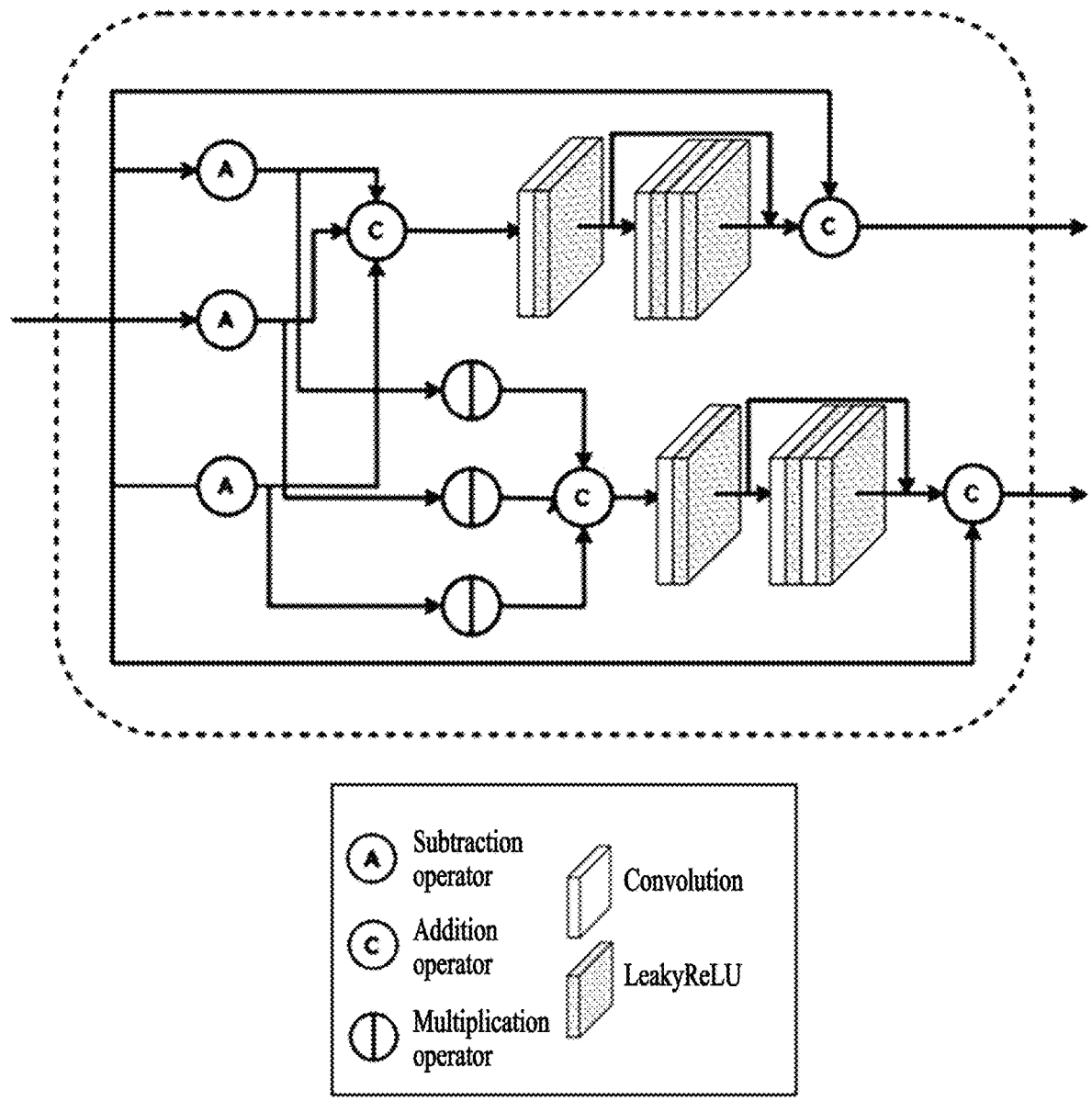
FIG. 13 illustrates an example of a structure of a crossover network.

FIG. 13 illustrates an example of a structure of a crossover network. Referring to FIG. 13, the crossover network may include three pooling layers A having different kernel sizes, three division operators, first through fourth splicing layers C, a first convolution layer, a second convolution layer, a first skip residual block, and a second skip residual block. The three pooling layers having different kernel sizes (e.g., kernel sizes of 3×3, 5×5, and 7×7) may be used to extract three low-frequency components with different scales from an input image (e.g., a 3-channel RGB image), respectively. The three division operators may be used to divide the three low-frequency components by the input image to obtain the corresponding three high-frequency components. The first splicing layer may be used to splice the three low-frequency components to one low-frequency component. The first convolution layer (e.g., a convolution layer with a kernel size of 3×3, which uses LeakyReLU as an activation function) may be used to extract a feature of the low-frequency component obtained by the splicing. The first skip residual block may include two convolution layers (e.g., two convolution layers with a convolution kernel size of 3×3 which use LeakyReLU as an activation function and maintain a size of a feature map using zero padding), and a skip connection, and may be used to perform feature processing on the low-frequency component of which the feature is extracted. The second splicing layer may be used to splice the three high-frequency components to one high-frequency component. The second convolution layer (e.g., a convolution layer with a kernel size of 3×3, which uses LeakyReLU as an activation function) may be used to extract a feature of the high-frequency component obtained by the splicing. The second skip residual block may include two convolution layers (e.g., two convolution layers with a convolution kernel size of 3×3 which use LeakyReLU as an activation function and maintain a size of a feature map using zero padding), and a skip connection, and may be used to perform feature processing on the high-frequency component of which the feature is extracted. The third splicing layer may be used to splice the input image and the low-frequency component, on which the feature processing is performed, and output a final low-frequency component. The fourth splicing layer may be used to splice the input image and the high-frequency component, on which the feature processing is performed, and output a final high-frequency component. The present disclosure is not limited to the structure of the above-described crossover network.

Figure 14:
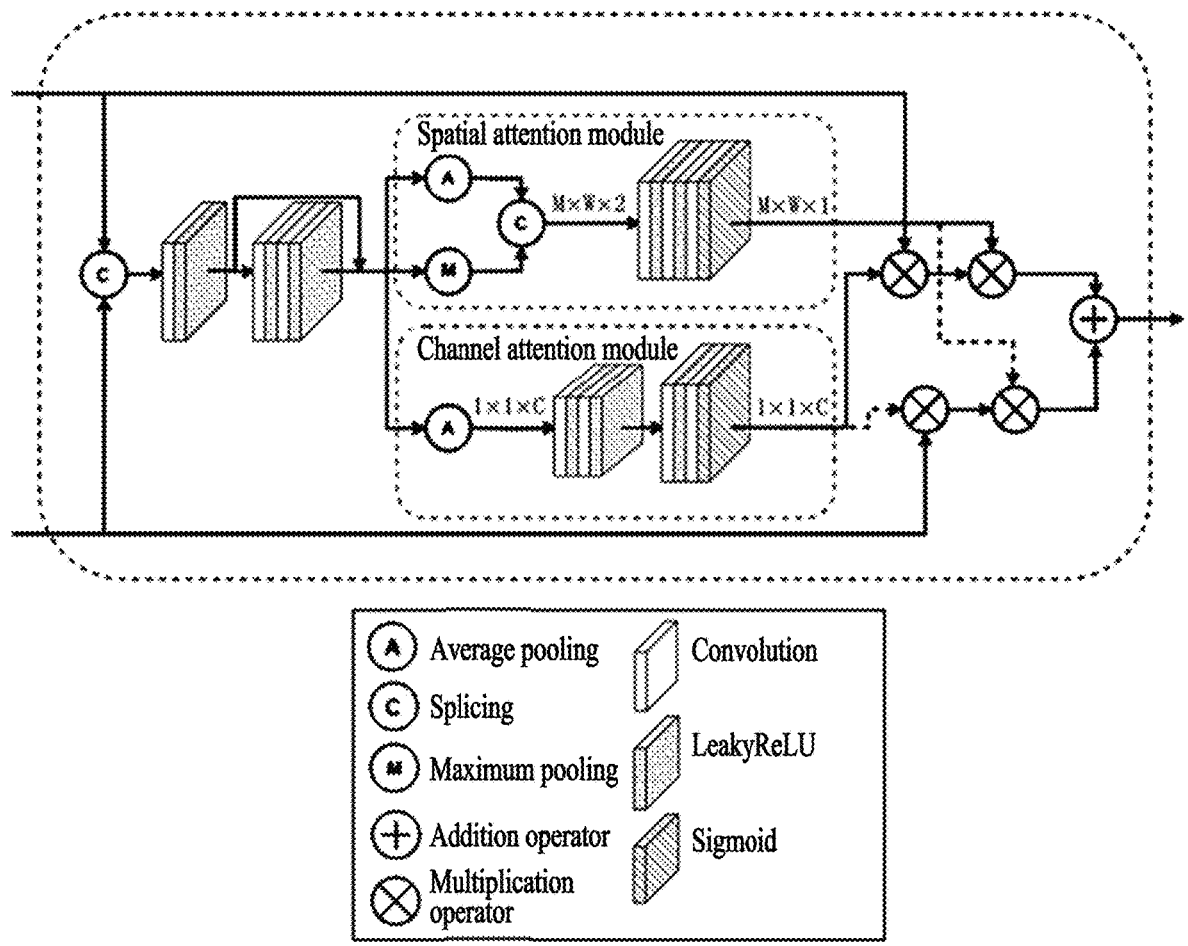
FIG. 14 illustrates an example of a structure of a fusion network.

FIG. 14 illustrates an example of a structure of a fusion network. Referring to FIG. 14, the fusion network may be implemented as a fusion network of a dual attention mechanism based on a spatial attention mechanism and a channel attention mechanism. The fusion network may include a spatial attention module and a channel attention module. The spatial attention module and the channel attention module may be used to assign weights to a low-frequency component and a high-frequency component, respectively, to perform splicing to a hidden variable expression to be finally compressed. The spatial attention module may perform a pooling operation on a feature map (for example, a hidden variable obtained by splicing a hidden variable of a high-frequency component and a hidden variable of a low-frequency component) in a channel direction, and may calculate a spatial attention score using a convolution layer. For example, the spatial attention module may independently perform an average pooling operation and a maximum pooling operation on the spliced hidden variables, may splice the average-pooled hidden variable and the maximum-pooled hidden variable, and may calculate a spatial attention score based on the spliced hidden variables, and thus an amount of computational operation may be effectively reduced. The channel attention module may generate a channel attention score using a convolution layer after performing a pooling operation on a feature map in a spatial dimension. The pooling operation of the channel attention module may be an average pooling operation or a maximum pooling operation. The low-frequency component may be weighted by a channel attention score Wc and subsequently weighted by a spatial attention score Ws (indicated by a solid line). The high-frequency component may be weighted by (1-Wc) and subsequently weighted by (1-Ws) (indicated by a dashed line), and accordingly, the high-frequency component may differ from the low-frequency component. A hidden variable representation of the original image may be obtained by adding weighted low-frequency and high-frequency feature maps. Through such soft fusion, a hidden variable with a higher quality may be obtained.

Specifically, the fusion network may include a splicing layer, a convolution layer, a skip residual block, a spatial attention module, a channel attention module, first through fourth multiplication operators, and an addition operator. The splicing layer may be used to splice a hidden variable of a high-frequency component and a hidden variable of a low-frequency component to a single hidden variable. The convolution layer may be used to extract features of spliced hidden variables. The skip residual block may include a convolution layer and a skip connection, and may be used to perform feature processing on a hidden variable after feature extraction. The spatial attention module may include an average pooling layer A, a maximum pooling layer M, a splicing layer C, and three convolution layers (e.g., three convolution layers with a convolution kernel size of 3×3 and of which first two convolution layers use LeakyReLU as an activation function and a last convolution layer uses sigmoid as an activation function). The spatial attention module may be used to pass the hidden variable, on which the feature processing is performed, through the average pooling layer and the maximum pooling layer. In addition, the spatial attention module may splice outputs of the average pooling layer and the maximum pooling layer through the splicing layer, may perform a pooling operation (image length× width×number of channels is M×W×2) on the spliced hidden variables in the channel direction, and may extract features of the channel-pooled hidden variables through the three convolution layers, to obtain a spatial attention score Ws (M×W×1).

The channel attention module may include a pooling layer (e.g., the average pooling layer A), two first convolution layers (e.g. Two convolution layers which have a convolution kernel size of 3×3 and "12" channels and which use LeakyReLU as an activation function), and two second convolution layers (e.g., two convolution layers which have a convolution kernel size of 3×3 and "128" channels and which use LeakyReLU and sigmoid as activation functions, respectively), and may be used to perform a pooling operation (1×1×C) on the spliced hidden variables in the spatial dimensions by pooling hidden variables after feature processing. In addition, the spatially pooled hidden variables may be channel-compressed through the first convolution layers, and features may be extracted from the channel-compressed hidden variables through the second convolution layers, to obtain a channel attention score Wc (1×1×C). The first multiplication operator and a second multiplication operator may be used to obtain a weighted hidden variable of the low-frequency component by first weighting the hidden variable of the low-frequency component by Wc and by weighting the hidden variable again by Ws. A third multiplication operator and the fourth multiplication operator may be used to obtain a weighted hidden variable of the high-frequency component by first weighting the hidden variable of the high-frequency component by (1-Wc) and by weighting the hidden variable by (1-Ws). The addition operator may be used to obtain a final hidden variable by adding the weighted hidden variable of the low-frequency component and the weighted hidden variable of the high-frequency component. The present disclosure is not limited to the structure of the fusion network.

Hereinafter, an example of a reconfiguration network will be described in detail.

Referring back to FIGS. 5 and 12, the reconstruction network and the coding network of the end-to-end image compression model may have a mirror structure. The reconstruction network may include at least one upsampling back projection module configured to perform at least one upsampling transformation on a decoded hidden variable to obtain a reconstruction image. Here, the reconstruction network may include a number of upsampling back projection modules corresponding to a number of times upsampling transformation is performed. In the present disclosure, the number of times upsampling transformation is performed and the number of upsampling back projection modules are not limited. According to an example, the reconstruction network may be formed by stacking four upsampling back projection modules, and a spatial attention module may be connected in front of each of a first upsampling back projection module and a third upsampling back projection module to enhance an expression capability thereof. However, the number of upsampling back projection modules, a number of spatial attention modules and positions of the spatial attention modules are not limited thereto. For example, a plurality of upsampling back projection modules may be directly stacked.

The upsampling back projection module may include an upsampling module, a reconstruction module, and an optimization module. The upsampling module may be used to obtain the second feature map by performing upsampling transformation on the input first feature map. In the case of a first upsampling module, the input first feature map may be a hidden variable obtained through decoding. The reconstruction module may be used to reconstruct the second feature map to obtain a third feature map with the same resolution as the first feature map. The optimization module may be used to obtain a fourth feature map as a final output of the upsampling transformation by performing optimization on the second feature map based on the difference value between the first feature map and the third feature map, and a reconstruction image may be used as a final output of a last upsampling transformation. Hereinafter, a structure of an upsampling back projection module will be described in detail.

According to an example, the upsampling module may be formed by alternately stacking two different types of residual blocks to implement a function of upsampling a feature map by a factor of 2 at once. For example, the structure of the upsampling model of the reconstruction network may be the same as that of FIG. 6, and the upsampling module may be formed by stacking a short-circuit residual block and a skip residual block. The short-circuit residual block may include two convolution layers and a short-circuit connection. A first convolution layer may be used to upsample a resolution of a feature map by a factor of 2 through deconvolution or subpixel convolution, and a second convolution layer may be used to provide a feature learning function of a convolution layer. The skip residual block may include two convolution layers (e.g., two convolution layers that have a convolution kernel size of 3×3 and "N" channels, that use LeakyReLU as an activation function and that maintain a size of a feature map using zero padding), and a skip connection, and may be used to obtain the second feature map by further learning effective features. The present disclosure is not limited to the above-described structure of the upsampling module.

According to an example, the reconstruction module of the reconstruction network may include a plurality of convolution layers that are sequentially connected, and may also include an operation of an attention module and a skip connection for enhancing a feature learning capability. For example, a structure of the reconstruction module of the reconstruction network may be the same as that of FIG. 7, and the reconstruction module may be configured by sequentially connecting a convolution layer (e.g., a first convolution layer, Cony 1×1) having a convolution kernel of 1×1, a downsampling layer, and three convolution layers (e.g., second through fourth convolution layers) having a convolution kernel of 1×1. The first convolution layer may be used to perform feature processing on the second feature map, and may use LeakyReLU as an activation function and maintain a size of a feature map after convolution, using zero padding without a change. The downsampling layer may be used to perform downsampling transformation (e.g., convolution, interpolation, etc.) on the second feature map on which the feature processing is performed. The second through fourth convolution layers may be used to obtain a third feature map by performing feature processing on the second feature map on which the downsampling transformation is performed. These three convolution layers may use LeakyReLU as an activation function and allow a number of output feature map channels to remain unchanged. The present disclosure is not limited to the structure of the reconstruction module.

According to an example, the optimization module may include a first difference value feedback submodule and a downsampling optimization submodule. The first difference value feedback submodule may be used to fuse and process information of the first feature map and the third feature map. Specifically, the first difference value feedback submodule may be used to optimize a difference value between the first feature map and the third feature map, and may obtain an optimized third feature map by optimizing the third feature map based on the optimized difference value. An upsampling optimization submodule may be used to obtain a fourth feature map by performing upsampling and optimization on the optimized third feature map.

For example, the first difference value feedback submodule of the reconstruction network may have the same structure as that of the first difference value feedback submodule of the coding network shown in FIG. 8.

For example, the upsampling optimization submodule of the reconstruction network may be the same as that of FIG. 9, and may include a short-circuit residual block and two connected convolution layers. The short-circuit residual block may include two convolution layers that are used to upsample the optimized third feature map and extract a feature of the upsampled third feature map, and a short-circuit connection. For example, a first convolution layer may be used to upsample a resolution of a feature map using deconvolution or subpixel convolution, and a second convolution layer (e.g., a convolution layer with a convolution kernel size of 1×1) may be used to extract a feature of the upsampled feature map. The first and second convolution layers may maintain a size of an output feature map using zero padding and use a GDN as a normalization function, to enhance a feature learning capability thereof. In addition, a fourth feature map may be obtained through feature learning of an output of the short-circuit residual block using two connected convolution layers (e.g., two convolution layers with a convolution kernel size of 3×3 which are sequentially connected).

According to an example, since in the reconstruction network, the first difference value feedback submodule may perform a difference value feedback optimization based on a low-resolution intermediate image (e.g., a reconstruction image obtained by downsampling), instead of performing a difference value feedback optimization based on a high-resolution intermediate image (e.g., a second feature map obtained by upsampling), the optimization module may further include a second difference value feedback submodule to perform the difference value feedback optimization based on the high-resolution intermediate image, to enhance an optimization effect. Specifically, the second difference value feedback submodule may be used to obtain a final fourth feature map by optimizing a difference value between the second feature map and the fourth feature map output by the upsampling optimization module and optimizing the fourth feature map based on the optimized difference value. Therefore, according to the examples, in each back projection module, a current feature map may be divided twice and optimized. Feature fusion and difference value feedback of multiple scales (e.g., a high resolution and a low resolution) may be realized. Accordingly, a model may more effectively extract and process new information by guaranteeing the overall numerical stability of a feature map. Thus, it may be possible to continue to increase the quality of a reconstruction image while maintaining the stability of training. In addition, through a highly modularized design, the back projection method may be easily distributed and extended. In practical applications, depending on a factor such as a model speed, a memory space, and compression quality, whether to use a multi-stage reconstruction and parameter sharing mechanism may be selected.

In an example, in the reconstruction network, a structure of the second difference value feedback submodule may be the same as a structure of the first difference value feedback submodule, similarly to the first difference value feedback submodule and the second difference value feedback submodule of the downsampling back projection module shown in FIG. 10.

In another example, in the reconstruction network, the structure of the second difference value feedback submodule may be different from the structure of the first difference value feedback submodule. For example, similarly to the first difference value feedback submodule and the second difference value feedback submodule of the downsampling back projection module shown in FIG. 11, the second difference value feedback submodule of the reconstruction network may be an attention mechanism-based difference value feedback submodule, and may include a subtraction operator, a first skip residual block, an attention module, a first multiplication operator, a second multiplication operator, an addition operator, and a second skip residual block. The subtraction operator may be used to obtain a second difference value feature map (also referred to as a "distinctive information feature map") by subtracting the fourth feature map output by the downsampling optimization submodule and the second feature map. The first skip residual block may include two convolution layers (e.g., two convolution layers with a convolution kernel of 3×3 which use LeakyReLU as an activation function and maintain an output size using zero padding), and a skip connection, and may be used to perform feature learning on the second difference value feature map. The attention module may be used to obtain an attention score by extracting a feature of the feature-learned second difference value feature map. Here, the attention module may be a spatial attention module or a channel attention module Wc. For example, a Squeeze-Excitation network may be used as a channel attention module. The first multiplication operator may be used to multiply Wc (indicated by a solid line) and the fourth feature map output by the downsampling optimization module to obtain a first weighted feature map. The second multiplication operator may be used to multiply the second feature map by (1-Wc) (indicated by a dashed line) to obtain a second weighted feature map. The addition operator may be used to obtain a weighted feature map by adding the first weighted feature map and the second weighted feature map. The second skip residual block may include two convolution layers (e.g., two convolution layers with a convolution kernel of 3×3 which use LeakyReLU and sigmoid as activation functions and maintain an output size using zero padding), and a skip connection, and may be used to obtain the optimized fourth feature map by performing feature learning on the weighted feature map.

In the present disclosure, the second difference value feedback submodule of the coding network may be implemented as an attention mechanism-based difference value feedback submodule. For example, a module may give more attention to a predetermined portion using a soft attention mechanism and selectively weight a feature map. Thus it may be possible to increase the effect and efficiency of image compression by further increasing an information processing and fusion capability of a difference value feedback module.

Figure 15:
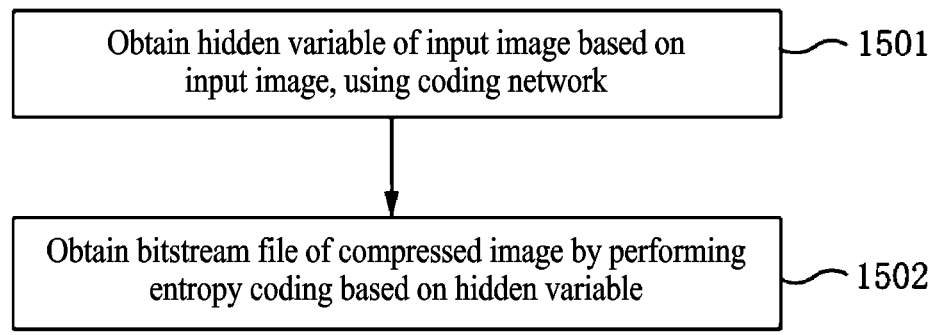
FIG. 15 is a flowchart illustrating an example of an image compression method.

FIG. 15 is a flowchart illustrating an example of an image compression method. The image compression method of FIG. 15 may apply to an image compression side or an image coding side.

Referring to FIG. 15, in operation 1501, a hidden variable of an input image may be obtained based on the input image, using a coding network. The coding network may be a deep learning neural network, and may include at least one downsampling back projection module.

According to an example, the input image may be an original image to be compressed. The input image may be transmitted via an image capturing device, or acquired from a local memory or a local database or received from an external electronic device (e.g., a computer device, a smartphone, etc.) or an external data source (e.g., the Internet, a server, a database, etc.) via an input device or a transmission medium, as necessary.

According to an example, the coding network may be a coding network in an end-to-end image compression model, according to the examples. The coding network has been described in detail above, and accordingly, further description thereof is not repeated herein.

According to an example, at least one downsampling transformation may be performed on the input image through the coding network to obtain the hidden variable. Here, the present disclosure does not limit the number of times downsampling transformation is performed. Specifically, each of the at least one downsampling back projection module included in the coding network may perform: performing downsampling transformation on a first feature map input to the downsampling back projection module to obtain a second feature map; obtaining a third feature map having the same resolution as that of the first feature map by reconstructing the second feature map; and obtaining a fourth feature map as an optimization result of the second feature map based on a difference value between the first feature map and the third feature map. In the case of multiple downsampling transformations, each downsampling transformation may correspond to a downsampling back projection module, the input image or a preprocessed feature map of the input image may be input as a first feature map of a first downsampling back projection module, and the hidden variable may be obtained based on an output of a last downsampling back projection module.

According to an example, for the obtaining of the fourth feature map as the optimization result of the second feature map based on the difference value between the first feature map and the third feature map, obtaining an optimized third feature map by optimizing the difference value between the first feature map and the third feature map and by optimizing the third feature map based on the optimized difference value; and obtaining the fourth feature map by performing downsampling and optimization on the optimized third feature map may be performed.

According to an example, for the obtaining of the fourth feature map as the optimization result of the second feature map based on the difference value between the first feature map and the third feature map, obtaining a final fourth feature map by optimizing a difference value between the obtained fourth feature map and the second feature map and by optimizing the obtained fourth feature map based on the optimized difference value may be further performed.

According to an example, for the obtaining of the third feature map having the same resolution as the resolution of the first feature map by reconstructing the second feature map, performing feature processing on the second feature map through a convolution operation; performing upsampling transformation on the second feature map on which the feature processing is performed; and obtaining the third feature map by performing feature processing on the second feature map, on which the upsampling transformation is performed, through a convolution operation may be performed. For example, a corresponding operation may be performed using a reconstruction module (e.g., the reconstruction module of FIG. 7) of the coding network.

According to an example, for the obtaining of the optimized third feature map by optimizing the difference value between the first feature map and the third feature map and by optimizing the third feature map based on the optimized difference value, obtaining a first difference value feature map by subtracting the first feature map and the third feature map; performing feature learning on the first difference value feature map through a convolution operation; obtaining an added feature map by adding the feature-learned first difference value feature map and a subtracted feature map; and obtaining the optimized third feature map by performing feature learning on the added feature map through a convolution operation may be performed. For example, a corresponding operation may be performed using a first difference value feedback submodule (e.g., the first difference value feedback submodule of FIG. 8) of the coding network.

According to an example, for the obtaining of the fourth feature map by performing the downsampling and optimization on the optimized third feature map, downsampling the optimized third feature map through a convolution operation and extracting a feature of the downsampled third feature map; and obtaining the fourth feature map by performing feature learning on a feature map obtained by extracting the feature through a convolution operation may be performed. For example, a corresponding operation may be performed using a downsampling optimization submodule (e.g., the downsampling optimization submodule of FIG. 9) of the coding network.

According to an example, for the obtaining of the final fourth feature map by optimizing the difference value between the obtained fourth feature map and the second feature map and by optimizing the obtained fourth feature map based on the optimized difference value, obtaining a second difference value feature map by subtracting the obtained fourth feature map and the second feature map; performing feature learning on the second difference value feature map through a convolution operation; obtaining an added feature map by adding the feature-learned second difference value feature map and a subtracted feature map; and obtaining the final fourth feature map by performing feature learning on the added feature map through a convolution operation may be performed. For example, a corresponding operation may be performed using a second difference value feedback submodule (e.g., the second difference value feedback module of FIG. 10) that is similar to the first difference value feedback submodule of the coding network.

According to an example, for the obtaining of the final fourth feature map by optimizing the difference value between the obtained fourth feature map and the second feature map and by optimizing the obtained fourth feature map based on the optimized difference value, obtaining a second difference value feature map by subtracting the obtained fourth feature map and the second feature map; performing feature learning on the second difference value feature map through a convolution operation; obtaining an attention score by extracting a feature of the feature-learned second difference value feature map through an attention mechanism; obtaining a first weighted feature map by multiplying the obtained fourth feature map and the attention score; obtaining a second weighted feature map by multiplying the second feature map and a value obtained by subtracting the attention score from "1"; obtaining a weighted feature map by adding the first weighted feature map and the second weighted feature map; and obtaining the final fourth feature map by performing feature learning on the weighted feature map through a convolution operation may be performed. For example, a corresponding operation may be performed using an attention mechanism-based second difference value feedback submodule (e.g., the second difference value feedback submodule of FIG. 11) of the coding network.

According to an example, when the coding network includes a high-frequency coding subnetwork and a low-frequency coding subnetwork, a high-frequency component and a low-frequency component may be extracted from the input image. For example, a corresponding operation may be performed using a crossover network (e.g., the crossover network of FIG. 13). A hidden variable of the high-frequency component may be obtained using the high-frequency coding subnetwork. The hidden variable of the high-frequency component may be obtained based on a fourth feature map obtained by a last downsampling back projection module among at least one downsampling back projection module included in the high-frequency coding subnetwork. A hidden variable of the low-frequency component may be obtained using the low-frequency coding subnetwork. The hidden variable of the low-frequency component may be obtained based on a fourth feature map obtained by a last downsampling back projection module among at least one downsampling back projection module included in the low-frequency coding subnetwork. The hidden variable of the input image may be obtained by fusing the hidden variable of the high-frequency component and the hidden variable of the low-frequency component.

According to an example, for the obtaining of the hidden variable of the input image by fusing the hidden variable of the high-frequency component and the hidden variable of the low-frequency component, obtaining a first splicing hidden variable by splicing the hidden variable of the high-frequency component and the hidden variable of the low-frequency component; using a spatial attention mechanism, independently performing average pulling and maximum pulling on the first splicing hidden variable in a channel direction, obtaining a second splicing hidden variable by splicing the first splicing hidden variable, on which the average pulling is performed, and the first splicing hidden variable, on which the maximum pulling is performed, and calculating a spatial attention score of the second splicing hidden variable through a convolution operation; using a channel attention mechanism, performing a pooling operation on the first splicing hidden variable in a spatial dimension and calculating a channel attention score of the first splicing hidden variable, on which the pooling operation is performed, through a convolution operation; obtaining a weighted hidden variable of the low-frequency component by weighting the hidden variable of the low-frequency component using the channel attention score and the spatial attention score; obtaining a weighted hidden variable of the high-frequency component by weighting the hidden variable of the high-frequency component using a value obtained by subtracting the channel attention score from "1" and a value obtained by subtracting the spatial attention score from "1"; and obtaining a sum of the weighted hidden variable of the low-frequency component and the weighted hidden variable of the high-frequency component as the hidden variable of the input image may be performed. For example, a corresponding operation may be performed using a fusion network (e.g., the fusion network of FIG. 14) according to the examples.

In operation 1502, a bitstream file of a compressed image may be obtained by performing entropy coding based on the hidden variable.

According to an example, the entropy coding may include an entropy coding-related operation to obtain the bitstream file of the compressed image based on the hidden variable, and may include, for example, at least one of a hyperparametric analysis network, side information entropy coding, side information entropy decoding, a hyperparametric generation network, a context model, and hidden variable entropy coding, however, the examples are not limited thereto.

Figure 16:
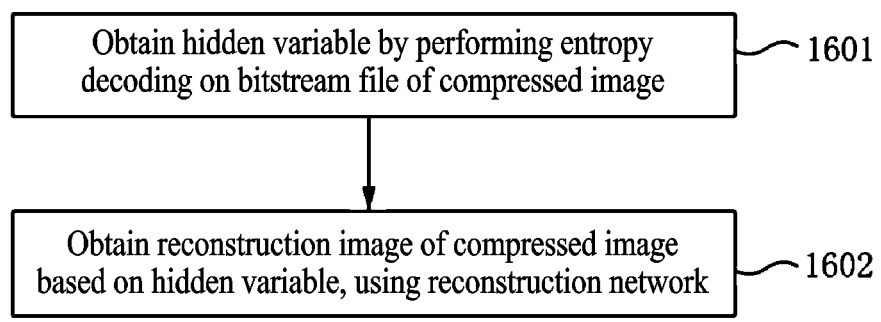
FIG. 16 is a flowchart illustrating an example of an image decompression method.

FIG. 16 is a flowchart illustrating an example of an image decompression method.

Referring to FIG. 16, in operation 1601, a hidden variable may be obtained by performing entropy decoding on a bitstream file of a compressed image.

According to an example, the bitstream file of the compressed image may be obtained from a local memory or a local database, or received from an external electronic device (e.g., a computer device, a smartphone, etc.) or an external data source (e.g., the Internet, a server, a database, etc.) via an input device or a transmission medium, as necessary.

According to an example, the entropy decoding operation may include an entropy decoding-related operation to obtain the hidden variable based on the bitstream file of the compressed image, and may include, for example, hidden variable entropy decoding, however, the examples are not limited thereto.

In operation 1602, a reconstruction image of the compressed image may be obtained using a reconstruction network based on the hidden variable. The reconstruction network may be a deep learning neural network, and may include at least one upsampling back projection module.

According to an example, the reconstruction network may be a reconstruction network in an end-to-end image compression model, according to the examples. The reconfiguration network has been described in detail above, and accordingly, further description thereof is not repeated herein.

According to an example, the reconstruction image may be obtained by performing at least one upsampling transformation on the hidden variable through the reconstruction network. Here, the present disclosure does not limit the number of times upsampling transformation is performed. Specifically, each of the at least one upsampling back projection module included in the reconstruction network may perform: performing upsampling transformation on the fifth feature map input to the upsampling back projection module to obtain the sixth feature map; obtaining the seventh feature map having the same resolution as that of the fifth feature map by reconstructing the sixth feature map; and obtaining the eighth feature map as an optimization result of the sixth feature map based on the difference value between the fifth feature map and the seventh feature map. In the case of multiple upsampling transformations, each upsampling transformation may correspond to an upsampling back projection module, and a first upsampling back projection module may obtain the input fourth feature map based on the hidden variable and use an output of a last upsampling back projection module as the reconstruction image.

According to an example, for the obtaining of the eighth feature map as the optimization result of the sixth feature map based on the difference value between the fifth feature map and the seventh feature map, obtaining an optimized seventh feature map by optimizing the difference value between the fifth feature map and the seventh feature map and by optimizing the seventh feature map based on the optimized difference value; and obtaining the eighth feature map by performing upsampling and optimization on the optimized seventh feature map may be performed.

According to an example, for the obtaining of the eighth feature map as the optimization result of the sixth feature map based on the difference value between the fifth feature map and the seventh feature map, obtaining a final eighth feature map by optimizing a difference value between the obtained eighth feature map and the sixth feature map and by optimizing the sixth feature map based on the optimized difference value may be further performed.

According to an example, for the obtaining of the seventh feature map having the same resolution as the resolution of the fifth feature map by reconstructing the sixth feature map, performing feature processing on the sixth feature map through a convolution operation; performing downsampling transformation on the sixth feature map on which the feature processing is performed; and obtaining the seventh feature map by performing feature processing on the sixth feature map, on which the downsampling transformation is performed, through a convolution operation may be performed. For example, according to the examples, a corresponding operation may be performed using the reconfiguration module of the reconfiguration network.

According to an example, for the obtaining of the optimized seventh feature map by optimizing the difference value between the fifth feature map and the seventh feature map and by optimizing the seventh feature map based on the optimized difference value, obtaining a third difference value feature map by subtracting the fifth feature map and the seventh feature map; performing feature learning on the third difference value feature map through a convolution operation; obtaining an added feature map by adding the feature-learned third difference value feature map and a subtracted feature map; and obtaining the optimized seventh feature map by performing feature learning on the added feature map through a convolution operation may be performed. For example, according to the examples, a corresponding operation may be performed using the first difference value feedback submodule of the reconfiguration network.

According to an example, for the obtaining of the eighth feature map by performing the upsampling and optimization on the optimized seventh feature map, upsampling the optimized seventh feature map through a convolution operation and extracting a feature of the upsampled seventh feature map; and obtaining the eighth feature map by performing feature learning on a feature map obtained by extracting the feature through a convolution operation may be performed. For example, according to the examples, a corresponding operation may be performed using the upsampling optimization module of the reconstruction network.

According to an example, for the obtaining of the final eighth feature map by optimizing the difference value between the obtained eighth feature map and the sixth feature map and by optimizing the obtained eighth feature map based on the optimized difference value, obtaining a fourth difference value feature map by subtracting the obtained eighth feature map and the sixth feature map; performing feature learning on the fourth difference value feature map through a convolution operation; obtaining an added feature map by adding the feature-learned fourth difference value feature map and a subtracted feature map; and obtaining the optimized seventh feature map by performing feature learning on the added feature map through a convolution operation may be performed. For example, according to the examples, a corresponding operation may be performed using the second difference value feedback submodule similar to the first difference value feedback submodule of the reconstruction network.

According to an example, for the obtaining of the final eighth feature map by optimizing the difference value between the obtained eighth feature map and the sixth feature map and by optimizing the obtained eighth feature map based on the optimized difference value, obtaining a fourth difference value feature map by subtracting the obtained eighth feature map and the sixth feature map; performing feature learning on the fourth difference value feature map through a convolution operation; obtaining an attention score by extracting a feature of the feature-learned fourth feature difference value feature map through an attention mechanism; obtaining a third weighted feature map by multiplying the obtained eighth feature map and the attention score; obtaining a fourth weighted feature map by multiplying the sixth feature map and a value obtained by subtracting the attention score from "1"; obtaining a weighted feature map by adding the third weighted feature map and the fourth weighted feature map; and obtaining the final eighth feature map by performing feature learning on the weighted feature map through a convolution operation may be performed. For example, a corresponding operation may be performed using an attention mechanism-based second difference value feedback submodule of the reconfiguration network according to the examples.

Figure 17:
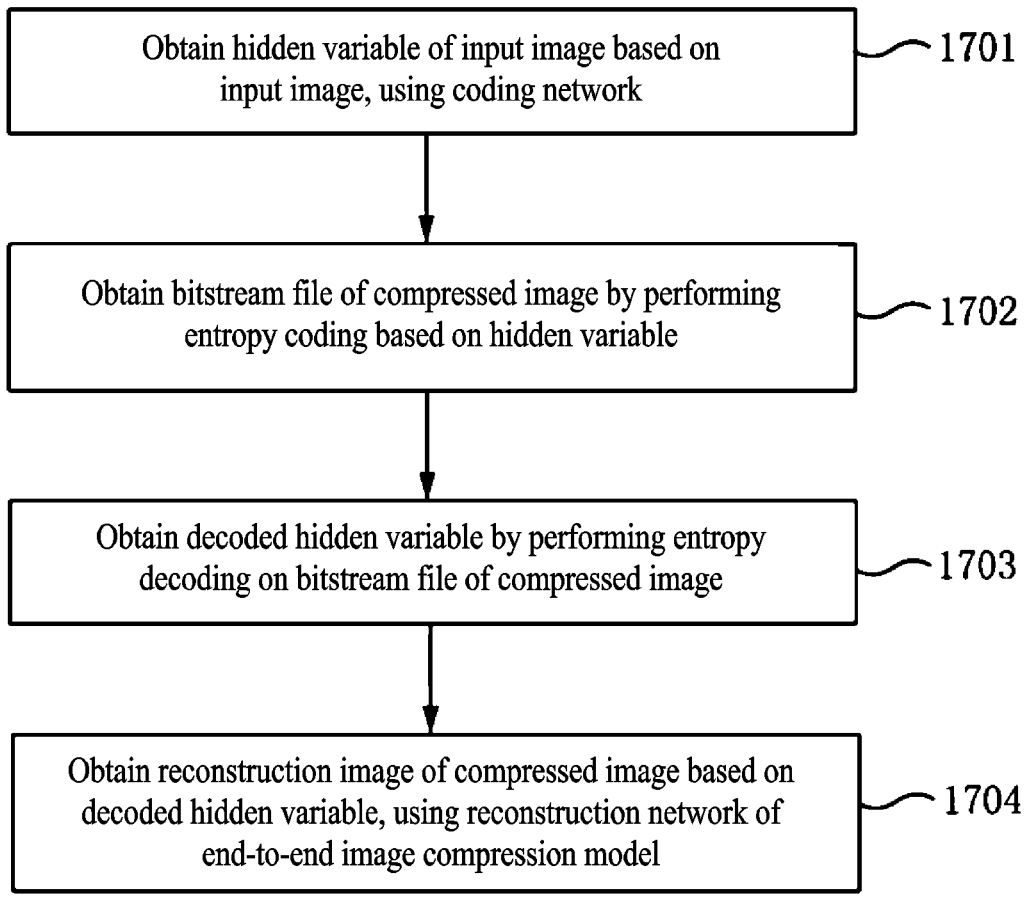
FIG. 17 is a flowchart illustrating an example of an end-to-end image compression method.

FIG. 17 is a flowchart illustrating an example of an end-to-end image compression method.

Referring to FIG. 17, in operation 1701, a hidden variable of an input image may be obtained based on the input image, using a coding network of an end-to-end image compression model.

According to an example, the input image may be an original image to be compressed. The input image may be transmitted via an image capturing device, or acquired from a local memory or a local database or received from an external electronic device (e.g., a computer device, a smartphone, etc.) or an external data source (e.g., the Internet, a server, a database, etc.) via an input device or a transmission medium, as necessary.

According to an example, the end-to-end image compression model may be the end-to-end image compression model shown in FIG. 5 or 12. Operation 1701 may be identical to operation 1501 described above with reference to FIG. 15, and accordingly, further description thereof is not repeated herein.

In operation 1702, a bitstream file of a compressed image may be obtained by performing entropy coding based on the hidden variable.

According to an example, the entropy coding may include an entropy coding-related operation to obtain the bitstream file of the compressed image based on the hidden variable, and may include, for example, an entropy coding-related operation in the entropy model in the end-to-end image compression model of FIG. 5 or 12. The entropy coding may include, but is not limited to, for example, at least one of a hyperparametric analysis network, side information entropy coding, side information entropy decoding, a hyperparametric generation network, a context model, and hidden variable entropy coding.

In operation 1703, a decoded hidden variable may be obtained by performing entropy decoding on the bitstream file of the compressed image.

According to an example, the entropy decoding may include an entropy decoding-related operation to obtain a hidden variable based on the bitstream file of the compressed image, for example, an entropy decoding-related operation in the entropy model of the end-to-end image compression model described in FIG. 5 or 12, and may include, for example, hidden variable entropy decoding, however, the examples are not limited thereto.

In operation 1704, a reconstruction image may be obtained based on the decoded hidden variable, using a reconstruction network of the end-to-end image compression model. Operation 1704 may be identical to operation 1602 described above with reference to FIG. 16, and accordingly, further description thereof is not repeated herein.

According to an example, the end-to-end image compression model (e.g., the end-to-end image compression model shown in FIG. 5 or 12) used in the image compression/decompression methods of FIGS. 15 through 17 may be a trained model. For example, the end-to-end image compression model may be trained through the following scheme: obtaining an image training set (e.g., a CLIC 2019 dataset, a Kodak dataset, etc.); obtaining a reconstruction image using the image compression method of FIG. 17 using an image of the image training set as an input image; calculating a loss function based on a mean square error of an input image and the reconstruction image; adjusting a parameter of the image compression model using the calculated loss function. For example, the loss function may be expressed as, but is not limited to:

$$L = R + \lambda D \qquad (5)$$

$$D = \frac{1}{N}\sum (I - \tilde{I})^2$$

may be satisfied.

L denotes the loss function, R denotes an estimated size of a compressed image, and A denotes a parameter for controlling a compression ratio and an image quality. If $\lambda$ increases, the compression ratio may decrease and the image quality may increase. Also, N denotes a number of image pixels, I denotes an input image, and $\tilde{I}$ denotes a reconstruction image.

For example, parameters of the end-to-end image compression model may be trained by optimizing the loss function shown in Equation (5) using an Adam optimizer for different parameters A. For example, a number of iterations of training may be $1.5 \times 10^6$, a batch size used in each operation may be "4", an initial learning rate may be $1 \times 10^{-4}$, and a learning rate for last 80000 operations may be adjusted to $1 \times 10^{-5}$.

Figure 18:
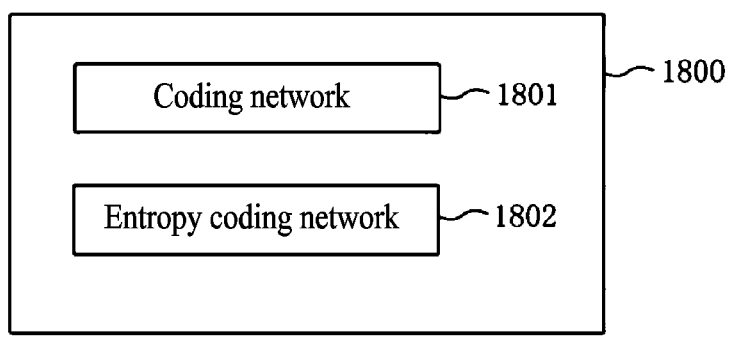
FIG. 18 illustrates an example of an image compression apparatus.

FIG. 18 illustrates an example of an image compression apparatus. An image compression apparatus 1800 of FIG. 18 may apply to an image compression stage or an image coding stage.

Referring to FIG. 18, the image compression apparatus 1800 may include a coding network 1801 and an entropy coding network 1802.

The coding network 1801 may obtain a hidden variable of an input image based on the input image. The coding network 1801 may be a deep learning neural network, and may include at least one downsampling back projection module.

According to an example, the input image may be an original image to be compressed. The input image may be transmitted via an image capturing device, or acquired from a local memory or a local database or received from an external electronic device (e.g., a computer device, a smartphone, etc.) or an external data source (e.g., the Internet, a server, a database, etc.) via an input device or a transmission medium, as necessary.

According to an example, the coding network 1801 may be a coding network in an end-to-end image compression model, according to the examples. The coding network has been described in detail above, and accordingly, further description thereof is not repeated herein.

According to an example, the coding network 1801 may perform at least one downsampling transformation on the input image to obtain the hidden variable. Here, the present disclosure does not limit the number of times downsampling transformation is performed. Specifically, each downsampling back projection module may include a downsampling module, a reconstruction module, and an optimization module. The downsampling module may be configured to perform downsampling transformation on a first feature map input to the downsampling back projection module to obtain a second feature map. The reconstruction module may be configured to obtain a third feature map with the same resolution as the first feature map by reconstructing the second feature map. The optimization module may be configured to obtain a fourth feature map as an optimization result of the second feature map, based on a difference value between the first feature map and the third feature map. In the case of multiple downsampling transformations, each downsampling transformation may correspond to a downsampling back projection module, the input image or a preprocessed feature map of the input image may be input as a first feature map of a first downsampling back projection module, and the hidden variable may be obtained based on an output of a last downsampling back projection module. According to an example, the optimization module may include a first difference value feedback submodule and a downsampling optimization submodule. The first difference value feedback submodule may be configured to obtain an optimized third feature map by optimizing the difference value between the first feature map and the third feature map and by optimizing the third feature map based on the optimized difference value. The downsampling optimization submodule may be configured to obtain the fourth feature map by performing downsampling and optimization on the optimized third feature map.

According to an example, the optimization module may further include a second difference value feedback submodule. The second difference value feedback submodule may be configured to obtain a final fourth feature map by optimizing a difference value between the obtained fourth feature map and the second feature map and by optimizing the fourth feature map based on the optimized difference value.

According to an example, the reconstruction module may be configured to perform feature processing on the second feature map through a convolution operation; perform upsampling transformation on the second feature map on which the feature processing is performed; and obtain a third feature map by performing feature processing on the second feature map, on which the upsampling transformation is performed, through a convolution operation. For example, the reconstruction module may be implemented using the reconstruction module (e.g., the reconstruction module shown in FIG. 7) of the coding network according to the examples.

According to an example, the first difference value feedback submodule in the optimization module may be configured to obtain a first difference value feature map by subtracting the first feature map and the third feature map; perform feature learning on the first difference value feature map through a convolution operation; obtain an added feature map by adding the feature-learned first difference value feature map and a subtracted feature map; and obtain the optimized third feature map by performing feature learning on the added feature map through a convolution operation. For example, the first difference value feedback submodule may be implemented using the first difference value feedback submodule (e.g., the first difference value feedback submodule shown in FIG. 8) of the coding network according to the examples.

According to an example, the downsampling optimization module in the optimization module may be configured to downsample the optimized third feature map through a convolution operation and extract a feature of the downsampled third feature map; and obtain a fourth feature map by performing feature learning on a feature map obtained by extracting the feature map through a convolution operation. For example, the downsampling optimization submodule may be implemented using the downsampling optimization submodule (e.g., the downsampling optimization submodule shown in FIG. 9) of the coding network according to the examples.

According to an example, the second difference value feedback submodule in the optimization module may be configured to obtain a second difference value feature map by subtracting the obtained fourth feature map and the second feature map; perform feature learning on the second difference value feature map through a convolution operation; obtain an added feature map by adding the feature-learned second difference value feature map and a subtracted feature map; and obtain the optimized third feature map by performing feature learning on the added feature map through a convolution operation. For example, the second difference value feedback submodule may be implemented using the second difference value feedback submodule (e.g., the second difference value feedback module shown in FIG. 10) similar to the first difference value feedback submodule of the coding network according to the examples.

According to an example, the second difference value feedback submodule in the optimization module may be configured to obtain the second difference value feature map by subtracting the obtained fourth feature map and the second feature map; perform feature learning on the second difference value feature map through a convolution operation; obtain an attention score by extracting a feature of the feature-learned second difference value feature map through the attention mechanism; obtain a first weighted feature map by multiplying the obtained fourth feature map and the attention score; obtain a second weighted feature map by multiplying the second feature map and a value obtained by subtracting the attention score from "1"; obtain a weighted feature map by adding the first weighted feature map and the second weighted feature map; and obtain the final fourth feature map by performing feature learning on the weighted feature map through a convolution operation. For example, the second difference value feedback submodule may be implemented using the attention mechanism-based second difference value feedback submodule (e.g., the second difference value feedback submodule shown in FIG. 11) of the coding network according to the examples.

According to an example, the image compression apparatus may further include a crossover network. The coding network may include a high-frequency coding subnetwork, a low-frequency coding subnetwork, and a fusion network. The high-frequency coding subnetwork and the low-frequency coding subnetwork may each include at least one downsampling back projection module. The crossover network may be configured to extract a high-frequency component and a low-frequency component from the input image, and may be implemented using, for example, the crossover network shown in FIG. 13. The high-frequency coding subnetwork may be configured to obtain a hidden variable of the high-frequency component, and the hidden variable of the high-frequency component may be obtained based on a fourth feature map obtained by a last downsampling back projection module among at least one downsampling back projection module included in the high-frequency coding sub-network. The low-frequency coding subnetwork may be configured to obtain a hidden variable of the low-frequency component, and the hidden variable of the low-frequency component may be obtained based on a fourth feature map obtained by a last downsampling back projection module among at least one downsampling back projection module included in the low-frequency coding subnetwork. The fusion network may be configured to obtain the hidden variable of the input image by fusing the hidden variable of the high-frequency component and the hidden variable of the low-frequency component.

According to an example, the fusion network may be configured to obtain a first splicing hidden variable by splicing the hidden variable of the high-frequency component and the hidden variable of the low-frequency component; using a spatial attention mechanism, independently perform average pulling and maximum pulling on the first splicing hidden variable in a channel direction, obtain a second splicing hidden variable by splicing the first splicing hidden variable, on which the average pulling is performed, and the first splicing hidden variable, on which the maximum pulling is performed, and calculate a spatial attention score of the second splicing hidden variable through a convolution operation; using a channel attention mechanism, perform a pooling operation on the first splicing hidden variable in a spatial dimension and calculate a channel attention score of the first splicing hidden variable, on which the pooling operation is performed, through a convolution operation; obtain a weighted hidden variable of the low-frequency component by weighting the hidden variable of the low-frequency component using the channel attention score and the spatial attention score; obtain a weighted hidden variable of the high-frequency component by weighting the hidden variable of the high-frequency component using a value obtained by subtracting the channel attention score from "1" and a value obtained by subtracting the spatial attention score from "1"; and obtain a sum of the weighted hidden variable of the low-frequency component and the weighted hidden variable of the high-frequency component as the hidden variable of the input image. For example, the fusion network may be implemented using the fusion network (e.g., the fusion network shown in FIG. 14) according to the examples.

The entropy coding network 1802 may obtain a bitstream file of a compressed image by performing entropy coding based on the hidden variable.

According to an example, the entropy coding may include an entropy coding-related operation to obtain the bitstream file of the compressed image based on the hidden variable, and may include, for example, at least one of a hyperparametric analysis network, side information entropy coding, side information entropy decoding, a hyperparametric generation network, a context model, and hidden variable entropy coding, however, the examples are not limited thereto.

Figure 19:
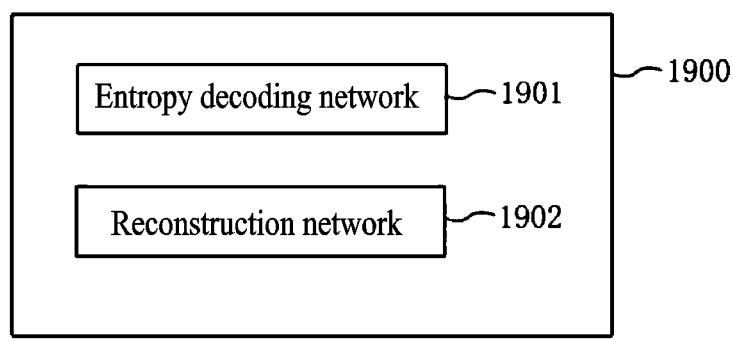
FIG. 19 illustrates an example of an image decompression apparatus.

FIG. 19 illustrates an example of an image decompression apparatus. An image decompression apparatus 1900 of FIG. 19 may be suitable for an image decompression side or an image decoding (reconstruction) side.

Referring to FIG. 19, the image decompression apparatus 1900 may include an entropy decoding network 1901 and a reconstruction network 1902.

The entropy decoding network 1901 may obtain a hidden variable by performing entropy decoding on a bitstream file of a compressed image.

According to an example, the bitstream file of the compressed image may be fetched from a local memory or a local database or received from an external electronic device (e.g., a computer device, a smartphone, etc.) or an external data source (e.g., the Internet, a server, a database, etc.) via an input device or a transmission medium, as necessary.

According to an example, the entropy decoding operation may include an entropy decoding-related operation to obtain the hidden variable based on the bitstream file of the compressed image, and may include, for example, hidden variable entropy decoding; however, the examples are not limited thereto.

The reconstruction network 1902 may obtain a reconstruction image of the compressed image based on the hidden variable. According to the examples, the reconstruction network 1902 may be a deep learning neural network and may include at least one upsampling back projection module.

According to an example, the reconstruction network may be a reconstruction network in an end-to-end image compression model, according to the examples. The reconfiguration network has been described in detail above, and accordingly further description thereof is not repeated herein.

According to an example, the reconstruction network 1902 may pass through at least one upsampling back projection module. At least one upsampling transformation may be performed on the hidden variable to obtain the reconstruction image. Here, the present disclosure does not limit the number of times upsampling transformation is performed. Specifically, each upsampling back projection module may include an upsampling module, a reconstruction module, and an optimization module. The upsampling module may be configured to perform upsampling transformation on a fifth feature map input to the upsampling module to obtain a sixth feature map; and obtain a seventh feature map having the same resolution as that of the fifth feature map by reconstructing the sixth feature map. The optimization module may be configured to obtain an eighth feature map as an optimization result of the sixth feature map, based on a difference value between the fifth feature map and the seventh feature map. In the case of multiple upsampling transformations, each upsampling transformation may correspond to an upsampling back projection module. A fifth feature map input to a first upsampling back projection module may be obtained based on the hidden variable and an output of a last upsampling back projection module may be used as the reconstruction image.

According to an example, the optimization module may include a first difference value feedback submodule and an upsampling optimization submodule. The first difference value feedback submodule may be configured to obtain an optimized seventh feature map by optimizing the difference value between the fifth feature map and the seventh feature map and by optimizing the seventh feature map based on the optimized difference value. The upsampling optimization submodule may be configured to obtain the eighth feature map by performing upsampling and optimization on the optimized seventh feature map. According to an example, the optimization module may further include a second difference value feedback submodule. The second difference value feedback submodule may be configured to obtain a final eighth feature map by optimizing a difference value between the obtained eighth feature map and the eighth feature map and by optimizing the sixth feature map based on the optimized difference value. According to an example, the reconstruction module may be configured to perform feature processing on the sixth feature map through a convolution operation; perform downsampling transformation on the sixth feature map on which the feature processing is performed; and process the seventh feature map by performing feature processing on the sixth feature map, on which the downsampling transformation is performed, through a convolution operation. For example, the reconfiguration module may be implemented using the reconfiguration module of the reconfiguration network according to the examples.

According to an example, the first difference value feedback submodule may be configured to obtain a third difference value feature map by subtracting the fifth feature map and the seventh feature map; perform feature learning on the third difference value feature map through a convolution operation; obtain an added feature map by adding the feature-learned third difference value feature map and a subtracted feature map; and obtain the optimized seventh feature map by performing feature learning on the added feature map through a convolution operation. For example, according to the examples, the first difference value feedback submodule may be implemented using the first difference value feedback submodule of the reconstruction network.

According to an example, the upsampling optimization submodule of the optimization module may be configured to upsample the optimized seventh feature map through a convolution operation and extract a feature of the upsampled seventh feature map; and obtain an eighth feature map by performing feature learning on a feature map obtained by extracting the feature through a convolution operation. For example, the upsampling optimization submodule may be implemented using the upsampling optimization module of the reconstruction network according to the examples.

According to an example, the second difference value feedback submodule may be configured to obtain a fourth difference value feature map by subtracting the obtained eighth feature map and the sixth feature map; perform feature learning on the fourth difference value feature map through a convolution operation; obtain an added feature map by adding the feature-learned fourth difference value feature map and a subtracted feature map; and obtain the optimized seventh feature map by performing feature learning on the added feature map through a convolution operation. For example, the second difference value feedback submodule may be implemented using the second difference value feedback submodule similar to the first difference value feedback submodule of the reconstruction network according to the examples.

According to an example, the second difference value feedback submodule may be configured to obtain a fourth difference value feature map by subtracting the obtained eighth feature map and the sixth feature map; perform feature learning on the fourth difference value feature map through a convolution operation; obtain an attention score by extracting a feature of the feature-learned fourth difference value feature map through an attention mechanism; obtain a third weighted feature map by multiplying the obtained eighth feature map and the attention score; obtain a fourth weighted feature map by multiplying the sixth feature map and a value obtained by subtracting the attention score from "1"; obtain a weighted feature map by adding the third weighted feature map and the fourth weighted feature map; and obtain the final eighth feature map by performing feature learning on the weighted feature map through a convolution operation. For example, the second difference value feedback submodule may be implemented using the attention mechanism-based second difference value feedback submodule of the reconfiguration network according to the examples.

Figure 20:
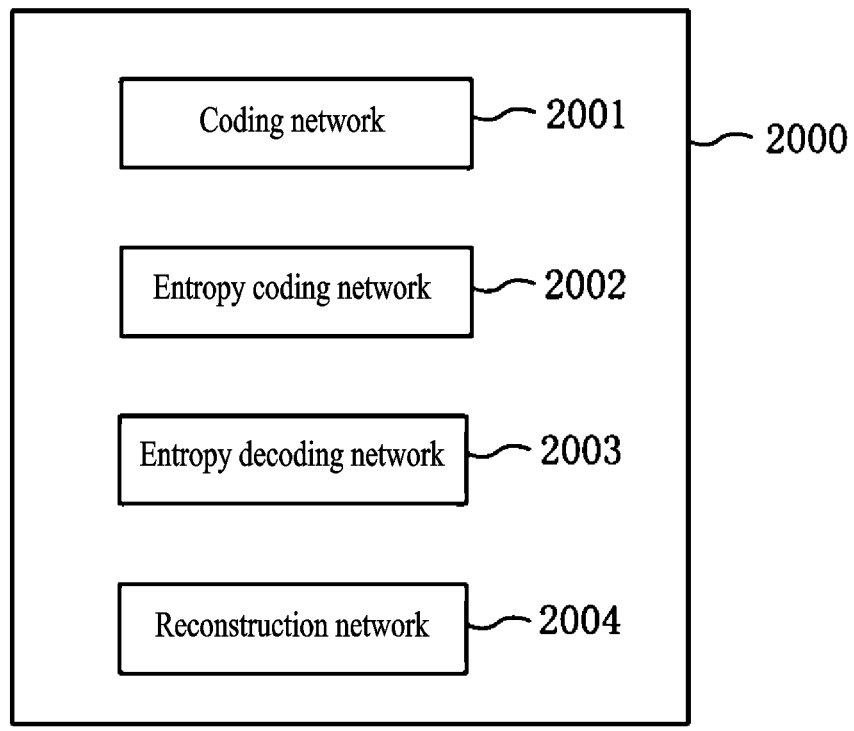
FIG. 20 illustrates an example of an end-to-end image compression apparatus.

FIG. 20 illustrates an example of an end-to-end image compression apparatus.

Referring to FIG. 20, an end-to-end image compression apparatus 2000 may include a coding network 2001, an entropy coding network 2002, an entropy decoding network 2003, and a reconstruction network 2004.

The coding network 2001 may obtain a hidden variable of an input image based on the input image.

According to an example, the input image may be an original image to be compressed. The input image may be transmitted via an image capturing device, or acquired from a local memory or a local database or received from an external electronic device (e.g., a computer device, a smartphone, etc.) or an external data source (e.g., the Internet, a server, a database, etc.) via an input device or a transmission medium, as necessary.

According to an example, an end-to-end image compression model may be the end-to-end image compression model described above with reference to FIG. 5 or 12. The coding network 2001 may be the same as the coding network 1801 described with reference to FIG. 18, and accordingly, further description thereof is not repeated herein.

The entropy coding network 2002 may obtain a bitstream file of a compressed image by performing entropy coding based on the hidden variable.

According to an example, the entropy coding may include an entropy coding-related operation to obtain the bitstream file of the compressed image based on the hidden variable, and may include, for example, an entropy coding-related operation in the entropy model in the end-to-end image compression model of FIG. 5 or 12. The entropy coding may include, for example, at least one of a hyperparametric analysis network, side information entropy coding, side information entropy decoding, a hyperparametric generation network, a context model, and hidden variable entropy coding; however, the examples are not limited thereto.

The entropy decoding network 2003 may obtain a decoded hidden variable by performing entropy decoding on the bitstream file of the compressed image.

According to an example, the entropy decoding may include an entropy decoding-related operation to obtain a hidden variable based on the bitstream file of the compressed image, for example, an entropy decoding-related operation in the entropy model of the end-to-end image compression model described in FIG. 5 or 12, and may include, for example, hidden variable entropy decoding, however, the examples are not limited thereto.

The reconstruction network 2004 may obtain a reconstruction image based on the decoded hidden variable, using a reconstruction network of the end-to-end image compression model. The reconstruction network 2004 may be the same as the reconstruction network 1902 described with reference to FIG. 19, and accordingly, further description thereof is not repeated herein.

According to an example, the end-to-end image compression model (e.g., the end-to-end image compression model shown in FIG. 5 or 12) used in the image compression/decompression methods of FIGS. 15 through 17 may be a trained model. For example, the end-to-end image compression model may be trained through the following scheme: obtaining an image training set (e.g., a CLIC 2019 dataset, a Kodak dataset, etc.); obtaining a reconstruction image using the image compression method of FIG. 17 using an image of the image training set as an input image; calculating a loss function based on a mean square error of an input image and the reconstruction image; adjusting a parameter of the image compression model using the calculated loss function. For example, the loss function may be a loss function as in Equation (5), however, there is no limitation thereto. For example, parameters of the end-to-end image compression model, according to the examples may be trained by optimizing the loss function as in Equation (5) using an Adam optimizer for different A. For example, a number of iterations of training may be $1.5 \times 10^6$, a batch size used in each operation may be "4", an initial learning rate may be $1 \times 10^{-4}$, and a learning rate for last 80000 operations may be adjusted to $1 \times 10^{-5}$.

Figure 21:
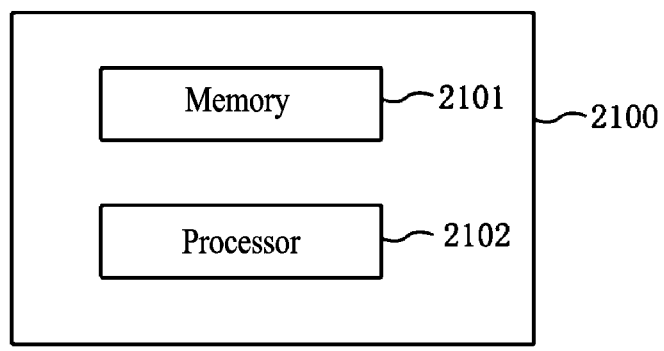
FIG. 21 illustrates an example of an electronic device.

FIG. 21 illustrates an example of an electronic device 2100.

Referring to FIG. 21, the electronic device 2100 may include at least one memory 2101, and at least one processor 2102. The at least one memory 2101 may store computer-executable instructions. According to the examples, if the computer-executable instructions are executed by the at least one processor 2102, the image compression method, the image decompression method, or the end-to-end image compression method may be performed.

For example, the electronic device 2100 may be a personal computer (PC), a tablet device, a personal digital assistant (PDA), a smartphone, or other devices capable of executing the above instruction set. Here, the electronic device 2100 may not need to be a single electronic device, and may be any device or assembly of a circuit capable of executing the above instructions (or an instruction set) alone or jointly. The electronic device 2100 may also be a part of an integrated control system or a system administrator, or may be configured as a portable electronic device interconnected to a local or remote (e.g., via wireless transmission) interface.

In the electronic device 2100, the processor 2102 may include a central processing unit (CPU), a graphics processing unit (GPU), a programmable logic device, a dedicated processor system, a microcontroller, or a microprocessor. In addition, the processor 2102 may include, for example, but is not limited to, an analog processor, a digital processor, a microprocessor, a multicore processor, a processor array, or a network processor.

The processor 2102 may execute instructions or code stored in the memory 2101 which may further store data. Instructions and data may also be transmitted and received over a network via a network interface device that may employ a known transport protocol.

The memory 2101 may be integrated with the processor 2102. For example, a random-access memory (RAM) or flash memory may be arranged in an integrated circuit microprocessor. The memory 2101 may also include a separate device such as an external disk drive, a storage array, or other storage devices that may be used by any database system. The memory 2101 and the processor 2102 may be operatively connected, or may communicate through, for example, an input/output (I/O) port, or a network connection, so that the processor 2102 may read files stored in the memory 2101.

In addition, the electronic device 2100 may further include a video display (e.g., a liquid crystal display (LCD)) and a user interaction interface (e.g., a keyboard, a mouse, or a touch input device). All components of the electronic device 2100 may be connected to each other through a bus and/or a network.

According to the image compression method and apparatus, the image decompression method and apparatus and end-to-end image compression method and apparatus of the present disclosure, the back projection method may be innovatively used for an image compression task, to realize bidirectional information exchange by feeding back a reconstruction result to a current task, to increase an amount of information and to enhance a quality of a feature map after resampling. Thus, it may be possible to effectively mitigate a decrease in a quality of an intermediate feature map obtained by upsampling/downsampling transformation due to a small number of convolution layers and inaccurate low-resolution information, and also possible to mitigate a reconstruction error caused by a quantized hidden variable.

In addition, in a back projection module (e.g., an upsampling back projection module and a downsampling back projection module) according to the examples, through a highly modularized design, the back projection method may be easily distributed and extended. In practical applications, depending on a factor such as a model speed, a memory space and a compression quality, whether to use a multi-stage reconstruction and parameter sharing mechanism may be selected. Specifically, the back projection module may be flexibly applied to at least one upsampling/downsampling transformation of the coding network and/or the reconstruction network, according to needs of practical applications. In addition, since the reconstruction module, the upsampling/downsampling optimization module, and a difference value feedback module are iteratively used in the back projection module, reused modules may share parameters in practical applications, reduce a complexity of a model and more quickly perform training convergence, and at the same time exhibit a predetermined normalization effect on model parameters.

In addition, according to the examples, low-frequency components and high-frequency components of the original image may be independently processed and fused through a frequency-domain decomposition and processing method, and accordingly a network may focus more on high-frequency details that are easily lost in a downsampling process, and may effectively optimize rate-distortion performance of the image compression method by flexibly processing and fusing low-frequency and high-frequency information after processing, as necessary.

As described above, in a downsampling operation of an image compression task, a back projection method may be used to realize bidirectional information exchange by feeding back a reconstruction result to a current task, increase an amount of information of a current feature map and enhance a quality of a feature map after resampling, and thus it may be possible to effectively mitigate a decrease in a quality of an intermediate feature map obtained through downsampling transformation due to a small number of convolution layers and inaccurate low-resolution information, and also possible to mitigate a reconstruction error due to a quantized hidden variable. In addition, through a highly modularized design, the back projection method may be easily distributed and extended. In practical applications, depending on a factor such as a model speed, a memory space and a compression quality, whether to use a multi-stage reconstruction and parameter sharing mechanism may be selected.

As described above, a difference value feedback optimization may be performed based on a high-resolution intermediate image (e.g., a reconstruction image obtained by upsampling), to increase a quality of a reconstruction image.

As described above, the difference value feedback optimization may be performed based on a low-resolution intermediate image (e.g., a second feature map obtained through downsampling transformation) in addition to the high-resolution intermediate image (e.g., a reconstruction image obtained by upsampling). A current feature map may be divided twice and optimized, and a feature fusion of difference value feedback with multiple scales (e.g., a high resolution and a low resolution) may be implemented, so that a model may more effectively extract and process new information by guaranteeing the overall numerical stability of a feature map. Thus, it may be possible to stably increase a quality of a reconstruction image while maintaining a stability of training.

As described above, the difference value optimization may be implemented based on the attention mechanism, and a module may give more attention to a predetermined portion using a soft attention mechanism and selectively assign a weight to a feature map. Thus, it may be possible to increase an effect and efficiency of image compression by further enhancing an information processing and fusion capability of a difference value feedback module.

As described above, since low-frequency components and high-frequency components may be individually processed and fused, a network may focus more on high-frequency details that are easily lost in a downsampling process, may explicitly and effectively process a loss of high-frequency information during a compression process, and may selectively enhance, process, and fuse the high-frequency hidden variable and the low-frequency hidden variable after downsampling, as necessary, to further increase a quality of a reconstruction image of a model at the same code rate, and to effectively optimize rate-distortion performance of the image compression method.

As described above, a maximum pooling operation and an average pooling operation may be performed on a feature map when the spatial attention score is calculated, and accordingly it may be possible to effectively reduce an amount of calculation. In addition, a fusion quality may be further enhanced through a soft fusion scheme of multiplying a feature map (i.e., a hidden variable) of the low-frequency component by the attention score and multiplying a feature map of the high-frequency component by (1−attention score).

As described above, a back projection method may be used to reconstruct a network, so that bidirectional information exchange may be realized by feeding back a reconstruction result to a current task, that an amount of information of a current feature map may be increased, and that a quality of a feature map after resampling may be enhanced. Thus, it may be possible to reduce an information loss due to quantization and reduce an inappropriate problem occurring in an upsampling process. In addition, through a highly modularized design, the back projection method may be easily distributed and extended. In practical applications, depending on a factor such as a model speed, a memory space and a compression quality, whether to use a multi-stage reconstruction and parameter sharing mechanism may be selected.

As described above, a difference value feedback optimization may be performed based on a high-resolution intermediate image (e.g., a reconstruction image obtained by upsampling), to increase a quality of a reconstruction image.

As described above, the difference value feedback optimization may be performed based on a low-resolution intermediate image (e.g., a second feature map obtained through downsampling transformation) in addition to the high-resolution intermediate image (e.g., a reconstruction image obtained by upsampling). A current feature map may be divided twice and optimized, and a feature fusion of difference value feedback with multiple scales (e.g., a high resolution and a low resolution) may be implemented, so that a model may more effectively extract and process new information by guaranteeing the overall numerical stability of a feature map. Thus, it may be possible to stably increase a quality of a reconstruction image while maintaining a stability of training.

As described above, the difference value optimization may be implemented based on the attention mechanism, and a module may give more attention to a predetermined portion using a soft attention mechanism and selectively assign a weight to a feature map. Thus, it may be possible to increase an effect and efficiency of image compression by further enhancing an information processing and fusion capability of a difference value feedback module.

In addition, according to the examples, low-frequency components and high-frequency components of the original image may be independently processed and fused through a frequency-domain decomposition and processing method, and accordingly a network may focus more on high-frequency details that are easily lost in a downsampling process, and may effectively optimize rate-distortion performance of the image compression method by flexibly processing and fusing low-frequency and high-frequency information after processing, as necessary.

The image compression apparatus, variational autoencoder, downsampling back projection module, downsampling module, reconstruction module, optimization module, spatial attention module, coding network, entropy coding network, image decompression apparatus, entropy decoding network, reconstruction network, end-to-end image compression apparatus, and electronic device in FIGS. 1-21 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-21 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A processor-implemented image compression method, comprising:
    obtaining a hidden variable of an input image using a coding network of a deep learning neural network comprising at least one downsampling back projection module, wherein each of the at least one downsampling back projection module comprises performing downsampling transformation on a first feature map of the input image input to the least one downsampling back projection module to obtain a second feature map, obtaining a third feature map having a same resolution as a resolution of the first feature map by reconstructing the second feature map, and obtaining a fourth feature map as an optimization result of the second feature map by feeding back a reconstruction error of a quantized hidden variable, based on a difference value between the first feature map and the third feature map as an information loss; and obtaining a bitstream file of a compressed image by performing entropy coding based on the hidden variable obtained based on the fourth feature map of a last downsampling back projection module among the at least one downsampling back projection module, wherein the reconstruction error of the quantized hidden variable mitigates quality degradation of an intermediate feature map.

2. The image compression method of claim 1, wherein the obtaining of the fourth feature map further comprises:

obtaining an optimized third feature map by optimizing the difference value between the first feature map and the third feature map, and optimizing the third feature map based on the optimized difference value; and obtaining the fourth feature map by performing downsampling and optimization on the optimized third feature map.

3. The image compression method of claim 2, wherein the obtaining of the fourth feature map further comprises obtaining a final fourth feature map by optimizing a difference value between the obtained fourth feature map and the second feature map, and optimizing the obtained fourth feature map based on the optimized difference value.

4. The image compression method of claim 1, wherein the obtaining of the third feature map comprises:

performing feature processing on the second feature map through a convolution operation;

performing upsampling transformation on the second feature map on which the feature processing is performed; and obtaining the third feature map by performing feature processing on the second feature map, on which the upsampling transformation is performed, through another convolution operation.

5. The image compression method of claim 2, wherein the obtaining of the optimized third feature map comprises:

obtaining a first difference value feature map by subtracting the first feature map and the third feature map;

performing feature learning on the first difference value feature map through a convolution operation;

obtaining an added feature map by adding the feature-learned first difference value feature map and a subtracted feature map; and obtaining the optimized third feature map by performing feature learning on the added feature map through another convolution operation.

6. The image compression method of claim 2, wherein the obtaining of the fourth feature map by performing the downsampling and the optimization on the optimized third feature map comprises:

downsampling the optimized third feature map through a convolution operation and extracting a feature of the downsampled third feature map; and obtaining the fourth feature map by performing feature learning on a feature map obtained by extracting the feature through another convolution operation.

7. The image compression method of claim 3, wherein the obtaining of the final fourth feature map comprises:

obtaining a second difference value feature map by subtracting the obtained fourth feature map and the second feature map;

performing feature learning on the second difference value feature map through a convolution operation;

obtaining an added feature map by adding the feature-learned second difference value feature map and a subtracted feature map; and obtaining the optimized third feature map by performing feature learning on the added feature map through another convolution operation.

8. The image compression method of claim 1, further comprising:

extracting a high-frequency component and a low-frequency component from the input image, wherein the coding network comprises a high-frequency coding subnetwork and a low-frequency coding subnetwork, the high-frequency coding subnetwork and the low-frequency coding subnetwork each comprise at least one downsampling back projection module, and the obtaining of the hidden variable of the input image based on the input image, using the coding network comprises:

obtaining a high-frequency hidden variable of the high-frequency component using the high-frequency coding subnetwork, the high-frequency hidden variable being obtained based on a high-frequency fourth feature map of a high-frequency last downsampling back projection module among at least one high-frequency downsampling back projection module included in the high-frequency coding subnetwork;

obtaining a low-frequency hidden variable of the low-frequency component using the low-frequency coding subnetwork, the low-frequency hidden variable being obtained based on a low-frequency fourth feature map a low-frequency last downsampling back projection module among at least one low-frequency downsampling back projection module included in the low-frequency coding subnetwork; and obtaining the hidden variable of the input image by fusing the high-frequency hidden variable and the low-frequency hidden variable.

9. The image compression method of claim 8, wherein the obtaining of the hidden variable of the input image by fusing the high-frequency hidden variable and the low-frequency hidden variable comprises:

obtaining a first splicing hidden variable by splicing the high-frequency hidden variable and the low-frequency hidden variable;

using a spatial attention mechanism, independently performing average pulling and maximum pulling on the first splicing hidden variable in a channel direction, obtaining a second splicing hidden variable by splicing the first splicing hidden variable, on which the average pulling is performed, and the first splicing hidden variable, on which the maximum pulling is performed, and calculating a spatial attention score of the second splicing hidden variable through a convolution operation;

using a channel attention mechanism, performing a pooling operation on the first splicing hidden variable in a spatial dimension and calculating a channel attention score of the first splicing hidden variable, on which the pooling operation is performed, through another convolution operation;

obtaining a weighted low-frequency hidden variable of the low-frequency component by weighting the low-frequency hidden variable using the channel attention score and the spatial attention score;

obtaining a weighted high-frequency hidden variable of the high-frequency component by weighting the high-frequency hidden variable using a value obtained by subtracting the channel attention score from "1" and a value obtained by subtracting the spatial attention score from "1"; and obtaining a sum of the weighted low-frequency hidden variable and the weighted high-frequency hidden variable as the hidden variable of the input image.

10. A processor-implemented image decompression method comprising:

obtaining a hidden variable by performing entropy decoding on a bitstream file of a compressed image; and obtaining a reconstructed image of the compressed image based on the hidden variable using a reconstruction network of a deep learning neural network comprising at least one upsampling back projection module, wherein each of the at least one upsampling back projection module comprises performing upsampling transformation on a fifth feature map of the compressed image input to the upsampling back projection module to obtain a sixth feature map, obtaining a seventh feature map having a same resolution as a resolution of the fifth feature map by reconstructing the sixth feature map, and obtaining an eighth feature map as an optimization result of the sixth feature map by feeding back a reconstruction error of a quantized hidden variable based on a difference value between the fifth feature map and the seventh feature map as an information loss, and using the eighth feature map obtained by a last upsampling back projection module among the at least one upsampling back projection module in the reconstruction network as the reconstructed image, wherein the reconstruction error of the quantized hidden variable mitigates quality degradation of an intermediate feature map.

11. The image decompression method of claim 10, wherein the obtaining of the eighth feature map comprises:

obtaining an optimized seventh feature map by optimizing the difference value between the fifth feature map and the seventh feature map and by optimizing the seventh feature map based on the optimized difference value; and obtaining the eighth feature map by performing upsampling and optimization on the optimized seventh feature map.

12. The image decompression method of claim 11, wherein the obtaining of the eighth feature map further comprises obtaining a final eighth feature map by optimizing a difference value between the obtained eighth feature map and the sixth feature map and by optimizing the sixth feature map based on the optimized difference value.

13. The image decompression method of claim 10, wherein the obtaining of the seventh feature map comprises:

performing feature processing on the sixth feature map through a convolution operation;

performing downsampling transformation on the sixth feature map on which the feature processing is performed; and obtaining the seventh feature map by performing feature processing on the sixth feature map, on which the downsampling transformation is performed, through another convolution operation.

14. The image decompression method of claim 11, wherein the obtaining of the optimized seventh feature map comprises:

obtaining a third difference value feature map by subtracting the fifth feature map and the seventh feature map;

performing feature learning on the third difference value feature map through a convolution operation;

obtaining an added feature map by adding the feature-learned third difference value feature map and a subtracted feature map; and obtaining the optimized seventh feature map by performing feature learning on the added feature map through another convolution operation.

15. The image decompression method of claim 11, wherein the obtaining of the eighth feature map by performing the upsampling and optimization on the optimized seventh feature map comprises:

upsampling the optimized seventh feature map through a convolution operation, and extracting a feature of the upsampled seventh feature map; and obtaining the eighth feature map by performing feature learning on a feature map obtained by extracting the feature through another convolution operation.

16. The image decompression method of claim 12, wherein the obtaining of the final eighth feature map comprises:

obtaining a fourth difference value feature map by subtracting the obtained eighth feature map and the sixth feature map;

performing feature learning on the fourth difference value feature map through a convolution operation;

obtaining an added feature map by adding the feature-learned fourth difference value feature map and a subtracted feature map; and obtaining the optimized seventh feature map by performing feature learning on the added feature map through another convolution operation.

17. The image decompression method of claim 12, wherein the obtaining of the final eighth feature map comprises:

obtaining a fourth difference value feature map by subtracting the obtained eighth feature map and the sixth feature map;

performing feature learning on the fourth difference value feature map through a convolution operation;

obtaining an attention score by extracting a feature of the feature-learned fourth difference value feature map through an attention mechanism;

obtaining a third weighted feature map by multiplying the obtained eighth feature map and the attention score;

obtaining a fourth weighted feature map by multiplying the sixth feature map and a value obtained by subtracting the attention score from "1";

obtaining a weighted feature map by adding the third weighted feature map and the fourth weighted feature map; and obtaining the final eighth feature map by performing feature learning on the weighted feature map through another convolution operation.

18. An image compression apparatus comprising:
a coding network configured to obtain a hidden variable of an input image, the coding network being a deep learning neural network and comprising at least one downsampling back projection module; and
an entropy coding network configured to obtain a bitstream file of a compressed image by performing entropy coding based on the hidden variable,
wherein
the at least one downsampling back projection module comprises a downsampling module, a reconstruction module, and an optimization module,
the downsampling module is configured to perform downsampling transformation on a first feature map of the input image input to the downsampling module to obtain a second feature map,
the reconstruction module is configured to obtain a third feature map having a same resolution as a resolution of the first feature map by reconstructing the second feature map,
the optimization module is configured to obtain a fourth feature map as an optimization result of the second feature map by feeding back a reconstruction error of a quantized hidden variable based on a difference value between the first feature map and the third feature map as an information loss, and
the hidden variable is obtained based on the fourth feature map obtained by a last downsampling back projection module among the at least one downsampling back projection module in the coding network,
wherein the reconstruction error of the quantized hidden variable mitigates quality degradation of an intermediate feature map.

19. The image compression apparatus of claim 18, wherein
the optimization module comprises a first difference value feedback submodule and a downsampling optimization submodule,
the first difference value feedback submodule is configured to obtain an optimized third feature map by optimizing the difference value between the first feature map and the third feature map and by optimizing the third feature map based on the optimized difference value, and
the downsampling optimization submodule is configured to obtain the fourth feature map by performing downsampling and optimization on the optimized third feature map.

20. The image compression apparatus of claim 18, further comprising a memory configured to store instructions; and
one or more processors configured to execute the instructions to configure the one or more processors to:
obtain the hidden variable of the input image, the coding network being the deep learning neural network and comprising the at least one downsampling back projection module; and
obtain the bitstream file of the compressed image by performing entropy coding based on the hidden variable,
wherein
the at least one downsampling back projection module comprises the downsampling module, the reconstruction module, and the optimization module,
the downsampling module is configured to perform downsampling transformation on the first feature map of the input image input to the downsampling module to obtain the second feature map,
the reconstruction module is configured to obtain the third feature map having the same resolution as the resolution of the first feature map by reconstructing the second feature map,
the optimization module is configured to obtain the fourth feature map as the optimization result of the second feature map, based on the difference value between the first feature map and the third feature map, and
the hidden variable is obtained based on the fourth feature map obtained by the last downsampling back projection module among the at least one downsampling back projection module in the coding network.

* * * * *